(12) United States Patent
Dai et al.

(10) Patent No.: US 10,584,276 B2
(45) Date of Patent: Mar. 10, 2020

(54) $CO_2$-SENSITIVE FRACTURING AND DISPLACEMENT FLUID AND METHOD OF MAKING THE SAME AND METHOD FOR FRACTURING AND DISPLACEMENT OF TIGHT OIL RESERVOIR

(71) Applicants: CHINA UNIVERSITY OF PETROLEUM (EAST CHINA), Shandong (CN); CHINA UNIVERSITY OF GEOSCIENCES (BEIJING), Beijing (CN); SCIENCE AND TECHNOLOGY RESEARCH INSTITUTE LTD., PETRO CHINA, Beijing (CN)

(72) Inventors: Caili Dai, Qingdao Shandong (CN); Mingwei Gao, Qingdao Shandong (CN); Mingwei Zhao, Qingdao Shandong (CN); Qing You, Beijing (CN); Guang Zhao, Qingdao Shandong (CN); Yining Wu, Qingdao Shandong (CN); Yongpeng Sun, Qingdao Shandong (CN); Lin Li, Qingdao Shandong (CN); Yifei Liu, Qingdao Shandong (CN); He Liu, Beijing (CN); Xin Wang, Beijing (CN); Baoshan Guan, Beijing (CN)

(73) Assignees: CHINA UNIVERSITY OF PETROLEUM (EAST CHINA), Shandong (CN); CHINA UNIVERSITY OF GEOSCIENCES (BEIJING), Beijing (CN); SCIENCE AND TECHNOLOGY RESEARCH INSTITUTE LTD., PETRO CHINA, Beijing (CN)

(*) Notice: Subject to any disclaimer, the term of this patent is extended or adjusted under 35 U.S.C. 154(b) by 0 days.

(21) Appl. No.: 16/392,315

(22) Filed: Apr. 23, 2019

(65) Prior Publication Data
US 2019/0330518 A1 Oct. 31, 2019

(30) Foreign Application Priority Data

Apr. 23, 2018 (CN) .......................... 2018 1 0368352

(51) Int. Cl.
*C09K 8/66* (2006.01)
*C09K 8/68* (2006.01)
(Continued)

(52) U.S. Cl.
CPC ................ *C09K 8/665* (2013.01); *C09K 8/68* (2013.01); *C09K 8/706* (2013.01); *E21B 43/26* (2013.01)

(58) Field of Classification Search
None
See application file for complete search history.

(56) References Cited

U.S. PATENT DOCUMENTS 7,833,943 B2 * 11/2010 Van Zanten ............. C09K 8/34
507/90
2016/0347990 A1 * 12/2016 Vanzin ................... C09K 8/584

FOREIGN PATENT DOCUMENTS

CN   107353886 A   11/2017
CN   108424760 A   8/2018

OTHER PUBLICATIONS

Qin et al. "Reversible Performance of Dodecyl Tetramethyl Guanidine Solution Induced by CO_2 Trigger" Detergent & Cosmetics, vol. 32, No. 11, Nov. 2009, 6 pages, with English Abstract.
(Continued)

*Primary Examiner* — John J Figueroa
(74) *Attorney, Agent, or Firm* — Calfee, Halter & Griswold LLP

(57) ABSTRACT

A $CO_2$-sensitive fracturing and displacement fluid contains a surfactant, an auxiliary agent, water, and $CO_2$, wherein $CO_2$ is liquid and/or supercritical $CO_2$. The $CO_2$-sensitive fracturing and displacement fluid provided by the invention does not flow back after completion of fracturing construction, and the gel breaking fluid displacement is carried out (Continued)

after soak for a period of time to improve the tight oil recovery ratio. The $CO_2$-sensitive fracturing and displacement fluid exerts the "one-agent multi-purpose" function of sand carrying, $CO_2$ energization and oil displacement, surfactant imbibition and oil discharge of a fracturing-displacement system in different development and production stages, and achieves the dual goals of expanding the utilization degree of tight oil and improving the displacement efficiency of the tight oil, which can effectively reduce costs and achieve the goal of unified, highly efficient and green development of oil and gas fields.

17 Claims, 9 Drawing Sheets

(51) Int. Cl.
*C09K 8/70* (2006.01)
*E21B 43/26* (2006.01)

(56) References Cited

OTHER PUBLICATIONS

Hong et al. "Synthesis and Properties of Erucoylamidopropyl Hydroxysulfobetaine" China Surfactant Detergent & Cosmetics, vol. 44, No. 1. Jan. 2014, 7 pages, with English Abstract.

* cited by examiner

CO₂-SENSITIVE FRACTURING AND DISPLACEMENT FLUID AND METHOD OF MAKING THE SAME AND METHOD FOR FRACTURING AND DISPLACEMENT OF TIGHT OIL RESERVOIR

CROSS REFERENCE TO RELATED APPLICATIONS

The present application claims priority to Chinese Patent Application No. CN201810368352.0, filed on Apr. 23, 2018, entitled "$CO_2$-sensitive fracturing-drainage system applicable to compact oil reservoir and preparation method and application method thereof", which is hereby specifically and entirely incorporated by reference.

FIELD OF THE INVENTION

The invention relates to the technical field of oil and gas field development, in particular to $CO_2$-sensitive fracturing and displacement fluid, a method for preparing a $CO_2$-sensitive fracturing and displacement fluid and a method for fracturing and displacement of a tight oil reservoir.

BACKGROUND OF THE INVENTION

With the deepening of oil and gas exploration and development, the proportion of unconventional oil and gas resource exploration and development will become larger and larger. China's unconventional oil and gas resources are very rich and the exploitable resources are about (89~126) billion tons of oil and gas equivalent, which is about 3 times of the conventional oil and gas. How to realize the efficient development of unconventional oil and gas resources is an important guarantee for national energy security, especially the unconventional oil and gas reservoirs with abundant reserves, ultra-low permeability, compactness and shale, which has great potential and has become a strategic substitute energy for conventional energy. Therefore, China regards unconventional oil and gas resources as a major area of national oil and gas development, and unconventional resource exploration and development and comprehensive utilization have become one of the current extensive research projects. Tight oil has become the most realistic unconventional oil and gas resource at present. Tight oil refers to the accumulation of oil and gas in tight reservoirs sandwiched or in close proximity to a high-quality hydrocarbon source rock system without undergoing large-scale and long-distance migration.

The efficient development of tight oil reservoirs faces the following three challenges: (1) the reservoir stratum develops micro-nano-scale pore throats, and increases the effective utilization rate of reserves, which is challenging. Tight oil reservoir pore throats are small, with a porosity less than 10%, and overburden pressure permeability less than 0.1 mD (or air permeability less than 1 mD), and 30%~50% of movable crude oil is stored in the submicro-scale pore throats of 0.1~1.0 μm. Due to the very poor physical properties of the reservoir stratum, it is necessary to form an effective seam network to improve the degree of pore communication by horizontal well segmental fracturing, volumetric fracturing and the like, so as to achieve effective utilization. However, the dual media system with severe heterogeneity of the matrix-seam network after fracturing exacerbates the utilization difficulty of reservoir matrix reserves. (2) due to the low pressure and low permeability of the reservoir stratum, it is challenging to increase the yield of a single well. Affected by the low pressure of the formation and low single well controlled reserves, the yield of production wells generally decrease rapidly after the initial short-term high yield; the large seepage resistance causes slow pressure transmission in the formation, and the production has the characteristics of long-term low yield, difficulty in stable production, and low cumulative oil production of a single well. (3) it is difficult to supplement the formation energy, and the improvement of the recovery ratio is challenging. The recovery degree of tight oil reservoirs relying on natural energy is generally below 10%. To increase the recovery degree of the reservoir, reservoir energy must be replenished by water injection or gas injection.

CN107353886A discloses a nanocomposite for preventing $CO_2$ gas channeling in tight oil reservoirs, and the nanocomposite is prepared by using nano silica as a core through surface modification of a silane coupling agent, a Michael addition reaction of methyl acrylate and amidation of 3-dimethylaminopropylamine. The preparation method of the nanocomposite comprises the steps: S1, preparation of nano silica; S2, surface modification of nano silica; S3, a Michael addition reaction of modified nano silica; and S4, an amidation reaction between carbomethoxy-terminated nano silica prepared in the step S3 and 3-dimethylaminopropylamine, separation, purifying and drying, so as to obtain the nanocomposite. The nanocomposite has the $CO_2$ response characteristic, so the nanocomposite can achieve the fluidity control and the profile improvement in the tight oil $CO_2$ flooding process, and achieve the effect of enhancing the oil recovery ratio. However, the method is only a perfection for enhancing the oil recovery ratio process through diffusion, energization and mass transfer in the $CO_2$ flooding process, and the effect is single. In addition, the injection of $CO_2$ is very demanding on the ground gas injection system and gas injection equipment, the gas injection pressure is high, and the continuous injection in the field is difficult.

SUMMARY OF THE INVENTION

The object of the present invention is to overcome the defects of $CO_2$-sensitive fracturing and displacement fluid in prior art, such as single effects, harsh utilization conditions, difficulty in continuous injection in the field and the like. The present invention provides a $CO_2$-sensitive fracturing and displacement fluid, a method for preparing the $CO_2$-sensitive fracturing and displacement fluid and a method for fracturing and displacement of a tight oil reservoir. The $CO_2$-sensitive fracturing and displacement fluid is suitable for the $CO_2$-sensitive fracturing-displacement system of a tight oil reservoir, and using a fracturing-displacement integrated process can greatly enhance the recovery rate of tight oil, and at the same time, can expand the utilization degree of tight oil and improve the efficiency of displacement of tight oil.

In order to achieve the above object, one aspect of the present invention provides a $CO_2$-sensitive fracturing and displacement fluid, containing a surfactant, an auxiliary agent, water, and $CO_2$, wherein the $CO_2$ is in a liquid and/or supercritical state, the content of the surfactant is 1-15 wt %, the content of the auxiliary agent is 0.1-10 wt %, and the content of the $CO_2$ in a liquid and/or the supercritical state is 10-70 wt % with respect to the total weight of the $CO_2$-sensitive fracturing and displacement fluid.

A second aspect of the present invention provides a method for preparing the aforementioned $CO_2$-sensitive fracturing and displacement fluid, wherein the method comprises the steps:

(1) mixing a surfactant, an auxiliary agent and water to form a base fluid, wherein the mixing process is carried out under stirring at a temperature of 30-50° C. for 5-20 min;

(2) introducing $CO_2$ into the base fluid for gelatinizing to form a gelatinized mixture, wherein the amount of $CO_2$ introduced clarifies the system;

(3) allowing the gelatinized mixture to stand until bubbles in the gelatinized mixture disappear, so that gelatinized fluid is obtained; and (4) re-introducing $CO_2$ into the gelatinized fluid until no more foam is generalized in the system to form the $CO_2$-sensitive fracturing and displacement fluid, wherein the $CO_2$ re-introducing condition makes $CO_2$ in the formed $CO_2$-sensitive fracturing and displacement fluid in a liquid or supercritical state, and the formed $CO_2$-sensitive fracturing and displacement fluid is a viscoelastic emulsion, wherein the dosage of the surfactant is 1-15 wt %, the dosage of the auxiliary agent is 0.1-10 wt %, and the dosage of $CO_2$ is 10-70 wt %, with respect to the total weight of the $CO_2$-sensitive fracturing and displacement fluid.

A third aspect of the present invention provides a method for fracturing and displacement of a tight oil reservoir, including: injecting the aforementioned $CO_2$-sensitive fracturing and displacement fluid and an encapsulated gel breaker into a reservoir, after completion of fracturing, allowing the gel breaker to flow out of capsules to break the gel, keeping for 5-15 days after the gel is broken, and then allowing the gel breaking fluid to flow back, wherein the dosage of the encapsulated gel breaker is 4-15 wt %, with respect to the total weight of the $CO_2$-sensitive fracturing and displacement fluid.

Advantageous effects of the present invention are as follows:

(1) In the reservoir fracturing process using the $CO_2$-sensitive fracturing and displacement fluid of the present invention, the reaction kinetics process is highly synergistic with the fracturing, energization, and displacement processes, and the $CO_2$-sensitive fracturing and displacement fluid exerts the "one-agent multi-purpose" function of sand carrying, $CO_2$ energization and oil displacement, surfactant imbibition and oil displacement thereof in different development and production stages;

(2) In the reservoir fracturing process using the $CO_2$-sensitive fracturing and displacement fluid of the present invention, the traditional concept of increasing production by means of fracturing, energizing, and drainage can be broken, and the cost reduction and effect increasing of the oil field can be significantly improved, thereby ultimately achieving the dual goal of expanding the utilization degree of tight oil and improving the efficiency of tight oil displacement; and (3) After the $CO_2$-sensitive fracturing and displacement fluid of the invention is used for reservoir fracturing, no backflow is required, and the soak and the gel breaking fluid flow back once after the gel is broken, which simplifies the traditional fracturing, production increase, and displacement process, solves the problem that the traditional fracturing and displacement fluid may not completely break the gel and has great damage to the reservoir, and also solves the problem that the cost of the fracturing and displacement fluid is high and the backflow fluid is seriously polluted, thereby achieving cost saving and environmental protection.

DESCRIPTION OF SYMBOLS

Figure 1:
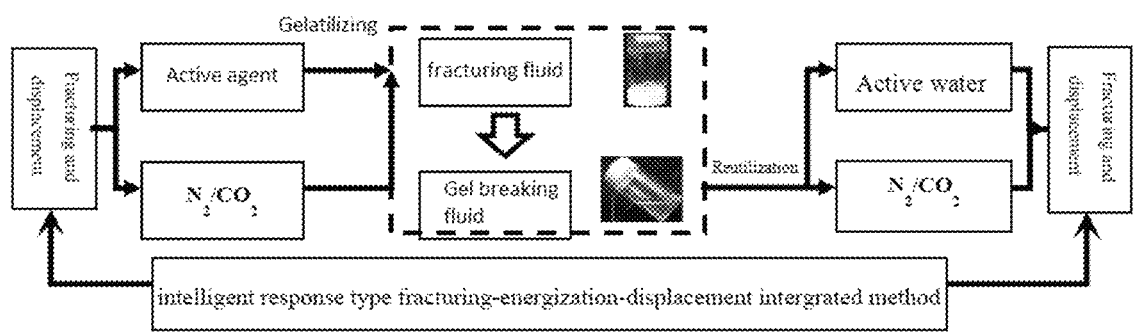
FIG. 1 is a schematic flow chart showing preparation of the $CO_2$-sensitive fracturing and displacement fluid and an intelligent response type fracturing-energization-displacement integrated method.

| | | |
|---|---|---|
| 1. Beaker | 2. Advection pump | 3. Three-way valve |
| 41. First injection valve | 42. Second injection valve | 43. First discharge valve |
| 44. Second discharge valve | 45. Axial pressure control valve | 46. Produced fluid control valve |
| 5. First intermediate container | 6. Second intermediate container | 8. Six-way valve |
| 91. First pressure gauge | 92. Second pressure gauge | 93. Third pressure gauge |
| 10. Core holder | 11. Measuring cylinder | 12. Hand pump |
| 13. Axial pressure controller | | |

DETAILED DESCRIPTION

The endpoints and any values of the ranges disclosed herein are not limited to the precise range or value; instead, those ranges or values shall be comprehended as encompassing values that are close to those ranges or values. For numerical ranges, the end points of the ranges, the end points of the ranges and the discrete point values, and the discrete point values may be combined to obtain one or more new numeric ranges, which shall be deemed as having been disclosed specifically disclosed herein.

One aspect of the present invention provides $CO_2$-sensitive fracturing and displacement fluid, containing a surfactant, an auxiliary agent, water, and $CO_2$, wherein $CO_2$ is in a liquid and/or supercritical state, the content of the surfactant is 1-15 wt %, the content of the auxiliary agent is 0.1-10 wt %, and the content of the $CO_2$ in a liquid and/or the supercritical state is 10-70 wt % with respect to the total weight of the $CO_2$-sensitive fracturing and displacement fluid.

According to the present invention, $CO_2$ in a liquid state refers to carbon dioxide liquefied into a liquid form, and can be formed by liquefying carbon dioxide gas under high pressure and low temperature conditions, for example, at a temperature of −20 to 25° C. and a pressure above 7.2 MPa, and is also commercially available.

According to the present invention, $CO_2$ in a supercritical state refers to $CO_2$ in a state in which the interface between the gas and liquid phases disappears (the temperature is higher than the critical temperature Tc=31.2° C., and the pressure is higher than the critical pressure Pc=7.38 MPa). The supercritical $CO_2$ has similar gas $CO_2$ diffusion and liquid $CO_2$ solubility, and has the characteristics of low viscosity and low surface tension, so that the supercritical $CO_2$ is able to rapidly penetrate into the microporous substance. In the present invention, $CO_2$ in a supercritical state may be formed by heating and pressurizing gaseous $CO_2$ or liquid $CO_2$, for example, the conditions of heating and pressurizing may include: heating to a temperature above 31.2° C., and pressurizing to a pressure above 7.38 MPa (heating to a temperature above 31.2° C., and pressurizing to a pressure above 7.38 MPa).

In the present invention, although the content of each component in the $CO_2$-sensitive fracturing and displacement fluid can be varied within a wide range, in order to improve the tight oil recovery ratio of the $CO_2$-sensitive fracturing and displacement fluid, preferably, the content of the surfactant is 1-15 wt %, the content of the auxiliary agent is 0.1-10 wt %, the content of $CO_2$ in a liquid and/or supercritical state is 10-70 wt %, and the balance is water, with respect to the total weight of the $CO_2$-sensitive fracturing and displacement fluid. More preferably, the content of the surfactant is 2-8 wt %, the content of the auxiliary agent is 0.5-3 wt %, and the content of $CO_2$ in a liquid and/or supercritical state is 10-50 wt %, with respect to the total weight of the $CO_2$-sensitive fracturing and displacement fluid. Further preferably, the content of the surfactant is 2-5 wt %, for example 2 wt %, 2.1 wt %, 2.11 wt %, 2.23 wt %, 2.5 wt %, 3 wt %, 3.4 wt %, 3.5 wt %, 4 wt %, 4.5 wt %, 5 wt %, and any content between any two adjacent contents; the content of the auxiliary agent is 0.7-2.5 wt %, for example 0.7 wt %, 0.75 wt %, 1 wt %, 1.4 wt %, 1.5 wt %, 1.8 wt %, 2 wt %, 2.2 wt %, 2.4 wt %, 2.5 wt %, 3 wt %, 3.5 wt %, 4 wt %, 4.5 wt %, 5 wt %, and any content between any two adjacent contents and the content of the liquid and/or supercritical $CO_2$ is 12-20 wt %, for example 12 wt %, 12.6 wt %, 14.8 wt %, 15 wt %, 16 wt %, 17 wt %, 17.4 wt %, 18 wt %, 19 wt %, 20 wt %, with respect to the total weight of the $CO_2$-sensitive fracturing and displacement fluid.

According to the invention, the surfactant is selected from the group consisting of a nonionic surfactant, an anionic surfactant, a zwitterionic surfactant and combination thereof.

According to the present invention, the $CO_2$-sensitive fracturing and displacement fluid is viscoelastic emulsion-like product in which the $CO_2$ in the system is in a liquid or supercritical state, which is formed by the following steps: mixing a surfactant, an auxiliary agent and water to form a base fluid, and then introducing $CO_2$ into the base fluid until microscopically, a wormlike micelle is formed in the system and macroscopically, the viscosity of the system increased significantly to obtain gelatinized fluid, and then further introducing liquid or supercritical $CO_2$ into the gelatinized fluid.

According to the present invention, the gelatinized fluid is obtained by introducing gaseous, liquid or supercritical $CO_2$ into the base fluid; the $CO_2$-sensitive fracturing and displacement fluid is obtained by introducing liquid or supercritical $CO_2$ into the gelatinized fluid.

According to the present invention, when the surfactant is a nonionic surfactant, the $CO_2$-sensitive fracturing and displacement fluid is a nonionic base fluid; when the surfactant is an anionic surfactant, the $CO_2$-sensitive fracturing and displacement fluid is an anionic base fluid; when the surfactant is a zwitterionic surfactant, the $CO_2$-sensitive fracturing and displacement fluid is a zwitterionic base fluid.

According to the present invention, preferably, the nonionic surfactant is selected from the group consisting of an amide surfactant, an amidine surfactant, a guanidine surfactant and combination thereof. Further preferably, the amide surfactant is selected from the group consisting of palmitic amide propyl dimethylamine, stearic amide propyl dimethylamine, oleamide propyl dimethylamine, erucoylamidopropyl dimethylamine and behenamide propyl dimethylamine and combination thereof; the amidine surfactant is selected from the group consisting of a linear or branched alkyl amidine having a heteroatom and having 12 to 36 carbon atoms; the guanidine surfactant is alkyltetramethylguanidine having 12 to 22 carbon atoms. In a further preferred embodiment of the above, the $CO_2$-sensitive fracturing and displacement fluid has a higher recovery ratio of tight oil.

According to the invention, preferably, the anionic surfactant is selected from the group consisting of carboxylate containing an aliphatic hydrocarbon chain, carboxylate containing fatty alcohol polyoxyethylene ether, sulfate containing an aliphatic hydrocarbon chain, sulfate containing fatty alcohol polyoxyethylene ether, sulfonate containing an aliphatic hydrocarbon chain, and sulfonate containing fatty alcohol polyoxyethylene ether and combination thereof. Further preferably, the carboxylate containing the aliphatic hydrocarbon chain is saturated or unsaturated aliphatic alkyl carboxylate having 12 to 22 carbon atoms, the carboxylate containing fatty alcohol polyoxyethylene ether is linear alkyl alcohol ether carboxylate having 12 to 22 carbon atoms, the sulfate containing the aliphatic hydrocarbon chain is saturated or unsaturated aliphatic alkyl sulfate having 12 to 22 carbon atoms, the sulfate containing fatty alcohol polyoxyethylene ether is linear alkyl alcohol ether sulfate having 12 to 22 carbon atoms, the sulfonate containing the aliphatic hydrocarbon chain is saturated or unsaturated aliphatic alkyl sulfonate having 12 to 22 carbon atoms, and the sulfonate containing fatty alcohol polyoxyethylene ether is linear alkyl alcohol ether sulfonate having 12 to 22 carbon atoms.

According to the invention, preferably, the zwitterionic surfactant is sulfobetaine and/or carboxybetaine. Further preferably, the sulfobetaine is selected from the group consisting of fatty amide propyl hydroxy sulfobetaine, fatty amide propyl sulfobetaine, linear alkyl sulfobetaine having 12 to 22 carbon atoms and combination thereof, such as erucoylamidopropyl hydroxysulfobetaine; the carboxybetaine is linear alkyl carboxybetaine and/or fatty amide carboxybetaine having 12 to 22 carbon atoms.

According to the invention, the auxiliary agent may be selected from a counterion cosurfactant, a $CO_2$ emulsifier and combination thereof. The counterion cosurfactant refers to a cosurfactant different in polarity from the polar group of the surfactant, and the addition of the counterion cosurfactant can change the surface activity and hydrophilic-lipophilic balance of the surfactant, participate in the formation of micelles, and adjust the polarity of water and oil.

According to the present invention, when the auxiliary agent contains the counterion cosurfactant and $CO_2$ emulsifier, preferably, the weight ratio of the counterion cosurfactant to the $CO_2$ emulsifier is between from 0.5:1 to 20:1, more preferably between from 0.8:1 to 10:1, further preferably between from 1:1 to 8:1. For example, the weight ratio of the content of the counterion cosurfactant to the content of the $CO_2$ emulsifier may be 1:1, 1.14:1, 1.5:1, 2:1, 3:1, 4:1, 5:1, 6:1, 7:1, 8:1, 9:1, 10:1, and any ratio between any two adjacent ratios.

According to the present invention, when the surfactant in the $CO_2$-sensitive fracturing and displacement fluid is a nonionic surfactant, the counterion cosurfactant may be an anionic cosurfactant. Preferably, the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof. For example, the anionic cosurfactant may be selected from the group consisting of sodium salicylate, potassium salicylate, sodium p-toluenesulfonate, potassium p-toluenesulfonate, sodium dodecyl sulfate, potassium dodecyl sulfate, sodium dodecyl sulfonate, potassium dodecyl sulfonate, sodium dodecylbenzenesulfonate, potassium dodecylbenzenesulfonate, sodium maleate, potassium maleate, sodium benzoate, potassium benzoate, sodium terephthalate, potassium terephthalate and combination thereof.

According to the present invention, when the surfactant in the $CO_2$-sensitive fracturing and displacement fluid is an anionic surfactant, the counterion cosurfactant may be a nonionic cosurfactant. Preferably, the nonionic cosurfactant is an organic amine cosurfactant, and in particular, the nonionic cosurfactant may be selected from organic amines having a structure represented by a formula (I).

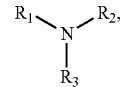

Formula (I)

wherein $R_1$ is a $C_1$-$C_4$ linear or branched alkyl group optionally substituted by an amino group, a $C_1$-$C_4$ linear or branched alkyl group optionally substituted by a hydroxy group, a phenyl group optionally substituted by an amino group, and a $C_2$-$C_3$ linear or branched alkyl group optionally substituted by a dimethylamino group;
$R_2$ and $R_3$ are each independently selected from —H, a $C_1$-$C_3$ linear or branched alkyl group optionally substituted by an amino group, and a $C_1$-$C_3$ linear or branched alkyl group optionally substituted by a hydroxy group.

According to the present invention, when the surfactant in the $CO_2$-sensitive fracturing and displacement fluid is a zwitterionic surfactant, the counterion cosurfactant may be a mixture of the aforementioned nonionic cosurfactant and anionic cosurfactant. Preferably, the nonionic cosurfactant and the anionic cosurfactant are present in a weight ratio between from 1:4 to 1:0.25. More preferably, the nonionic cosurfactant and the anionic cosurfactant are present in a weight ratio between from 1:3 to 1:0.5. Further preferably, the nonionic cosurfactant and the anionic cosurfactant are present in a weight ratio between from 1:2.5 to 1:1.

According to the present invention, the $CO_2$ emulsifier may be a liquid $CO_2$ emulsifier and/or a supercritical $CO_2$ emulsifier. The liquid $CO_2$ emulsifier and the supercritical $CO_2$ emulsifier are the same or different, and each is selected from the group consisting of sodium bis(2-ethylhexyl)sulfosuccinate, octylphenyl polyoxyethylene ether, a fluorocarbon surfactant and combination thereof. Preferably, the fluorocarbon surfactant is selected from the group consisting of an alcohol amine salt type anionic fluorocarbon surfactant, a betaine type zwitterionic fluorocarbon surfactant, a quaternary ammonium salt type cationic fluorocarbon surfactant, a potassium carboxylate type anionic fluorocarbon surfactant, a nonionic fluorocarbon surfactant, an anionic fluorocarbon surfactant, an amine oxide type cationic fluorocarbon surfactant, an oil-soluble fluorocarbon surfactant, an acrylate nonionic fluorocarbon surfactant, a solvent-type fluorocarbon surfactant, a nonionic polyoxyethylene ether fluorocarbon surfactant, a propenyl quaternary ammonium salt type cationic fluorocarbon surfactant, an amino acid type fluorocarbon surfactant and combination thereof.

According to a preferred embodiment of the present invention, the $CO_2$-sensitive fracturing and displacement fluid contains a nonionic surfactant, an anionic cosurfactant, water and $CO_2$, and the content of the nonionic surfactant is 1-15 wt %, the content of the anionic cosurfactant is 0.1-10 wt %, and the content of $CO_2$ is 10-70 wt % with respect to the total weight of the $CO_2$-sensitive fracturing and displacement fluid, wherein the nonionic surfactant is selected from the group consisting of palmitic amide propyl dimethylamine, stearic amide propyl dimethylamine, oleamide propyl dimethylamine, erucoylamidopropyl dimethylamine, behenamide propyl dimethylamine, N'-dodecyl-N,N-dimethylacetamidine, N'-hexadecyl-N,N-dimethylacetamidine, N'-octadecyl-N,N-dimethylacetamidine, N,N'-didodecylethylamidine, dodecyltetramethylguanidine, hexadecyltetramethylguanidine, octadecyltetramethylguanidine and combination thereof; the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof; $CO_2$ is in a liquid and/or supercritical state.

According to another preferred embodiment of the present invention, the $CO_2$-sensitive fracturing and displacement fluid contains a nonionic surfactant, an anionic cosurfactant, water, $CO_2$ and a $CO_2$ emulsifier, and the content of the nonionic surfactant is 1-15 wt %, the content of the anionic cosurfactant is 0.1-10 wt %, the content of the $CO_2$ is 10-70 wt %, and the content of the $CO_2$ emulsifier is 0.1-10 wt %, with respect to the total weight of the $CO_2$-sensitive fracturing and displacement fluid, wherein the nonionic surfactant is selected from the group consisting of palmitic amide propyl dimethylamine, stearic amide propyl dimethylamine, oleamide propyl dimethylamine, erucoylamidopropyl dimethylamine, behenamide propyl dimethylamine, N'-dodecyl-N,N-dimethylacetamidine, N'-hexadecyl-N,N-dimethylacetamidine, N'-octadecyl-N,N-dimethylacetamidine, N,N'-didodecylethylamidine, dodecyltetramethylguanidine, hexadecyltetramethylguanidine, octadecyltetramethylguanidine and combination thereof; the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof; $CO_2$ is in a liquid and/or supercritical state, and the $CO_2$ emulsifier is selected from the group consisting of sodium bis(2-ethylhexyl)sulfosuccinate, octylphenyl polyoxyethylene ether, a fluorocarbon surfactant and combination thereof.

According to another preferred embodiment of the present invention, the $CO_2$-sensitive fracturing and displacement fluid contains an anionic surfactant, a nonionic cosurfactant, water and $CO_2$, and the content of the anionic surfactant is 1-15 wt %, the content of the nonionic cosurfactant is 0.1-10 wt %, the content of $CO_2$ is 10-70 wt %, with respect to the total weight of the $CO_2$-sensitive fracturing and displacement fluid, and wherein the anionic surfactant is selected from the group consisting of saturated or unsaturated aliphatic hydrocarbyl carboxylate having 12 to 22 carbon atoms, linear alkyl alcohol ether carboxylate having 12 to 22 carbon atoms, saturated or unsaturated aliphatic hydrocarbyl sulfate having 12 to 22 carbon atoms, linear alkyl alcohol ether sulfate having 12 to 22 carbon atoms, saturated or unsaturated aliphatic hydrocarbyl sulfonate having 12 to 22 carbon atoms, and linear alkyl alcohol ether sulfonate having 12 to 22 carbon atoms, and combination thereof; the nonionic cosurfactant is selected from the group consisting of N,N,N',N'-tetramethyl-1,3-propanediamine, 3-diethylaminopropylamine, N,N-dimethyl-p-phenylenediamine, p-phenylenediamine, tetramethyl-ethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof; and $CO_2$ is in a liquid and/or supercritical state.

According to another preferred embodiment of the present invention, the $CO_2$-sensitive fracturing and displacement fluid contains an anionic surfactant, a nonionic cosurfactant, water, $CO_2$ and a $CO_2$ emulsifier, and the content of the anionic surfactant is 1-15 wt %, the content of the nonionic cosurfactant is 0.1-10 wt %, the content of $CO_2$ is 10-70 wt %, and the content of the $CO_2$ emulsifier is 0.1-10 wt %, with respect to the total weight of the $CO_2$-sensitive fracturing and displacement fluid, and wherein the anionic surfactant is selected from the group consisting of saturated or unsaturated aliphatic hydrocarbyl carboxylate having 12 to 22 carbon atoms, linear alkyl alcohol ether carboxylate having 12 to 22 carbon atoms, saturated or unsaturated aliphatic hydrocarbyl sulfate having 12 to 22 carbon atoms, linear alkyl alcohol ether sulfate having 12 to 22 carbon atoms, saturated or unsaturated aliphatic hydrocarbyl sulfonate having 12 to 22 carbon atoms, and linear alkyl alcohol ether sulfonate having 12 to 22 carbon atoms, and combination thereof; the nonionic cosurfactant is selected from the group consisting of N,N,N',N'-tetramethyl-1,3-propanediamine, 3-diethylaminopropylamine, N,N-dimethyl-p-phenylenediamine, p-phenylenediamine, tetramethyl-ethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof; and $CO_2$ is in a liquid and/or supercritical state, and the $CO_2$ emulsifier is selected from the group consisting of sodium bis(2-ethylhexyl)sulfosuccinate, octylphenyl polyoxyethylene ether, a fluorocarbon surfactant and combination thereof.

According to another preferred embodiment of the present invention, the $CO_2$-sensitive fracturing and displacement fluid contains a zwitterionic surfactant, a nonionic cosurfactant, an anionic cosurfactant, water and $CO_2$, and the content of the zwitterionic surfactant is 1-15 wt %, the sum content of the mixture of the nonionic cosurfactant and the anionic cosurfactant is 0.1-10 wt %, the content of $CO_2$ is 10-70 wt %, wherein the weight ratio of the nonionic cosurfactant to the anionic cosurfactant in the mixture is between from 1:4 to 1:0.25, with respect to the total weight of the $CO_2$-sensitive fracturing and displacement fluid, and the zwitterionic surfactant is selected from the group consisting of fatty amide propyl hydroxy sulfobetaine, fatty amide propyl sulfobetaine, linear alkyl sulfobetaine having 12 to 22 carbon atoms, linear alkyl carboxybetaine having 12 to 22 carbon atoms, fatty amide carboxybetaine and combination thereof, such as erucoylamidopropyl hydroxysulfobetaine; the nonionic cosurfactant is selected from the group consisting of N,N,N',N'-tetramethyl-1,3-propanediamine, 3-diethylaminopropylamine, N,N-dimethyl-p-phenylenediamine, p-phenylenediamine, tetramethyl-ethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof; the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof; $CO_2$ is in a liquid and/or supercritical state.

According to another preferred embodiment of the present invention, the $CO_2$-sensitive fracturing and displacement fluid contains a zwitterionic surfactant, a nonionic cosurfactant, an anionic cosurfactant, water and $CO_2$, as well as a $CO_2$ emulsifier, and the content of the zwitterionic surfactant is 1-15 wt %, the sum content of the mixture of the nonionic cosurfactant and the anionic cosurfactant is 0.1-10 wt %, the content of $CO_2$ is 10-70 wt %, wherein the weight ratio of the nonionic cosurfactant to the anionic cosurfactant in the mixture is between from 1:4 to 1:0.25, and the content of $CO_2$ emulsifier is 0.1-10 wt %, with respect to the total weight of the $CO_2$-sensitive fracturing and displacement fluid, and the zwitterionic surfactant is selected from the group consisting of fatty amide propyl hydroxy sulfobetaine, fatty amide propyl sulfobetaine, linear alkyl sulfobetaine having 12 to 22 carbon atoms, linear alkyl carboxybetaine having 12 to 22 carbon atoms, fatty amide carboxybetaine and combination thereof, such as erucoylamidopropyl hydroxysulfobetaine; the nonionic cosurfactant is selected from the group consisting of N,N,N',N'-tetramethyl-1,3-propanediamine, 3-diethylaminopropylamine, N,N-dimethyl-p-phenylenediamine, p-phenylenediamine, tetramethyl-ethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof; the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof; $CO_2$ is in a liquid and/or supercritical state, and the $CO_2$ emulsifier is selected from the group consisting of sodium bis(2-ethylhexyl)sulfosuccinate, octylphenyl polyoxyethylene ether, a fluorocarbon surfactant and combination thereof.

A second aspect of the present invention provides a method for preparing the aforementioned $CO_2$-sensitive fracturing and displacement fluid, and the preparation method comprises the steps:
(1) mixing a surfactant, an auxiliary agent and water to form a base fluid, wherein the mixing process is carried out under stirring at a temperature of 20-50° C. for 5-20 min;
(2) introducing $CO_2$ into the base fluid for gelatinizing to form a gelatinized mixture, wherein the amount of $CO_2$ introduced clarifies the system;
(3) allowing the gelatinized mixture to stand until bubbles in the gelatinized mixture disappear, so that gelatinized fluid is obtained; and
(4) re-introducing $CO_2$ into the gelatinized fluid until no more foam is generalized in the system to form the $CO_2$-sensitive fracturing and displacement fluid, wherein the $CO_2$ re-introducing condition makes $CO_2$ in the formed $CO_2$-sensitive fracturing and displacement fluid in a liquid or supercritical state, and the formed $CO_2$-sensitive fracturing and displacement fluid is a viscoelastic emulsion.

In the method for preparing the $CO_2$-sensitive fracturing and displacement fluid according to the present invention, in the process of forming the base fluid in the step (1), in order to prevent agglomeration or mixing unevenness of the components, preferably, the mixing process is carried out under stirring. The conditions of the mixing preferably include a temperature of 20° C. to 50° C. and a time of 5 to 20 minutes.

In the method for preparing the $CO_2$-sensitive fracturing and displacement fluid according to the present invention, the state of $CO_2$ introduced into the base fluid may be in a gaseous state, a liquid state or a supercritical state, preferably in a gaseous state; the state of $CO_2$ introduced into the gelatinized fluid may be in a liquid state or a supercritical state.

In the method for preparing $CO_2$-sensitive fracturing and displacement fluid according to the present invention, the rate of introduction of $CO_2$ into the base fluid is preferably 0.1-20 mL·min$^{-1}$, more preferably 10-20 mL·min$^{-1}$. This makes it possible to form gelatinized fluid having a good viscoelasticity.

In the preparation method of the $CO_2$-sensitive fracturing and displacement fluid according to the present invention, the time for introducing $CO_2$ into the base fluid can be determined according to the content of $CO_2$ in the fracturing and displacement fluid required for actual use, for example, the time for introducing $CO_2$ into the base fluid may be 1-2 min.

In the preparation method of the $CO_2$-sensitive fracturing and displacement fluid according to the present invention, a surfactant, an auxiliary agent and water are mixed to form a base fluid having a low viscosity, and $CO_2$ is introduced into the base fluid so that microscopically, a wormlike micelle is formed and macroscopically, the viscosity of the formed $CO_2$-sensitive fracturing and displacement fluid is greatly improved, and the system is thickened, and gelatinized fluid is obtained, then $CO_2$ is introduced into the gelatinized fluid until foam is no longer formed in the system, wherein $CO_2$ contained in the formed $CO_2$-sensitive fracturing and displacement fluid is in a liquid or supercritical state, and the formed $CO_2$-sensitive fracturing and displacement fluid is a viscoelastic emulsion, thereby obtaining a $CO_2$-sensitive fracturing and displacement fluid with a high drainage efficiency of the tight oil.

A third aspect of the present invention provides a reservoir fracturing method, wherein the reservoir fracturing method comprises the steps: injecting the aforementioned $CO_2$-sensitive fracturing and displacement fluid or the $CO_2$-sensitive fracturing and displacement fluid prepared by the aforementioned method into a reservoir together with the encapsulated gel breaker, after completion of fracturing, allowing the gel breaker to flow out of capsules to break the gel, keeping for 5-15 days after the gel is broken, and then allowing the gel breaking fluid to flow back, wherein the dosage of the encapsulated gel breaker is 4-15 wt %, with respect to the total weight of the $CO_2$-sensitive fracturing and displacement fluid.

In the reservoir fracturing method of the present invention, the dosage of the encapsulated gel breaker is preferably 5-10 wt %.

In the reservoir fracturing method of the present invention, the capsule core of the encapsulated gel breaker is a gel breaker, and the capsule shell is a polymer film, and the content of the capsule core is 70-80% by weight, preferably 73-78% by weight; the content of the capsule shell is 20-30% by weight, preferably 22-27% by weight, with respect to the total weight of the encapsulated gel breaker. When the content of the capsule shell is too low, it is disadvantageous for the delayed release of the gel breaker; when the content of the capsule shell is too high, the release time of the gel breaker is too long, which is disadvantageous for the gel breaking effect at the end of the fracturing; when the content of the capsule shell is 22-27% by weight and the content of the capsule core is 73-78% by weight, it is advantageous for the encapsulated gel breaker to exert an optimal gel breaker delayed release effect. The gel breaker in the encapsulated gel breaker is preferably prepared by regranulation, and the particle size of the gel breaker preferably ranges from 80% by weight between the standard sieve SSW 0.9/0.45, and the applicable temperature is 50-90° C.

The gel breaker may be selected from persulfates, such as potassium persulfate and/or ammonium persulfate, and the polymer film may be selected from the group consisting of a polyamide film, a cellulose film, a copolymer film of a crosslinkable olefin and a derivative thereof, a copolymer film of a crosslinkable sulfonated olefin and a derivative thereof, a rubber film and combination thereof, for example, the polyamide film may be selected from nylon 6, nylon 9, nylon 12, nylon 66 and combination thereof; the cellulose film may be selected from methyl cellulose and/or ethyl cellulose; the copolymer film of the crosslinkable olefin and the derivative thereof may be selected from polyvinyl fluoride, polyacrylonitrile, a polyvinylidene chloride copolymer and combination thereof; the copolymer film of the crosslinkable sulfonated olefin and the derivative thereof may be selected from sulfonated polystyrene, a sulfonated ethylene propylene copolymer, a sulfonated ethylene propylene diene terpolymer or combinations thereof; the rubber film may be selected from sulfonated styrene butadiene rubber.

In the above preferred embodiment, a better effect of reservoir fracturing can be achieved.

After the fracturing by using the $CO_2$-sensitive fracturing displacement liquid provided by the invention, there is no need to flow back, and the soak and the gel breaking fluid flow back once after the gel is broken, which effectively simplifies the traditional fracturing, production increase, and displacement process.

Hereunder the present invention will be detailed in Examples.

In the following Examples, the erucoylamidopropyl hydroxysulfobetaine is prepared according to the method disclosed in Synthesis and Properties of Erucoylamidopropyl Hydroxysulfobetaine [J]. China Surfactant Detergent & Cosmetics, 2014, 44(1), YU Hong-jiang, LIU Yu, XIAO Zhi-hai;

N,N,N',N'-tetramethyl-1,3-propanediamine is purchased from Shanghai Aladdin Biochemical Technology Co., Ltd., and the trade name is T106825;

Sodium p-toluenesulfonate is purchased from Shanghai Aladdin Biochemical Technology Co., Ltd., and the trade name is T108370;

Sodium bis(2-ethylhexyl)sulfosuccinate is purchased from Shanghai Aladdin Biochemical Technology Co., Ltd., and the trade name is A196243;

Sodium octadecyl sulfonate is purchased from J&K Technology Co., Ltd., and the product number is 38491;

N,N-Dimethylpropanolamine is purchased from Shanghai Aladdin Biochemical Technology Co., Ltd., and the trade name is D155704;

Octyl phenyl polyoxyethylene ether (TX-100) is purchased from Shanghai Aladdin Biochemical Technology Co., Ltd., and the trade name is T109026;

Erucoylamidopropyl dimethylamine is prepared according to the method disclosed in Synthesis and Properties of Erucoylamidopropyl Hydroxysulfobetaine [J]. China Surfactant Detergent & Cosmetics, 2014, 44(1), YU Hong-jiang, LIU Yu, XIAO Zhi-hai;

Sodium maleate is purchased from Shanghai Aladdin Biochemical Technology Co., Ltd., and the trade name is M134639;

The fluorocarbon surfactant is purchased from Xinxiang Chunchen Environmental Protection Technology Co., Ltd., and the trade name is FSD-127;

Behenyl betaine is synthesized by the following method: Octadecylamine and isopropyl ether (using isopropyl ether as a solvent) are added in a dry flask equipped with a dropping funnel, and magnetically stirred first to dissolve octadecylamine. Triethylamine is added and triethylamine is used to absorb HF formed by the reaction. Under magnetic stirring, perfluorooctyl sulfonyl fluoride is slowly added dropwise into the flask. The molar ratio of the reactants, $C_8F_{17}SO_2F$:octadecylamine:triethylamine=1:1.5:1.5 is controlled, after the dropwise addition is completed, the dropping funnel is replaced by a reflux condenser and heating reflux is performed for 2-6 hours. The reaction is cooled to room temperature, and then atmospheric distillation is performed, followed by distillation under reduced pressure to remove isopropyl ether. The residue is stirred with an appropriate amount of a dilute aqueous hydrochloric acid solution, and the unreacted amine is removed, so that the unreacted amine is dissolved in the washing liquid in a form of an ammonium salt. After the product is layered, the lower-layer solid (which may also be a viscous gelatinous solid) is washed with water for multiple times to obtain a crude product, and the number of washing is determined by measuring the surface tension of the washing liquid (taking the supernatant). When the surface tension of the washing liquid does not continue to increase, the lower-layer solid is taken out and dried under vacuum, and recrystallized with dichloromethane to obtain a product;

Sodium lauryl polyoxyethylene ether sulfate is purchased from Jiangsu Hai'an Petrochemical Company, and the trade name is L-23;

p-phenylenediamine is purchased from Shanghai Aladdin Biochemical Technology Co., Ltd., and the trade name is P128784;

Dodecyltetramethylguanidine is synthesized according to the method disclosed in Reversible Performance of Dodecyl Tetramethyl Guanidine Solution Induced by $CO_2$ Trigger [J]. Detergent & Cosmetics, 2009, 32(11): 18-22, QIn Yong, J I Jun-ling, WANG Yuan, et al.;

Sodium salicylate is purchased from Shanghai Aladdin Biochemical Technology Co., Ltd., and the trade name is S104177;

The encapsulated gel breaker is purchased from Weifang Xinzhou Energy Technology Co., Ltd., and the trade name is GSN-02-20;

The rheometer is purchased from ThermoFisher Scientific Company, and the trade name is HAAKE MARS 60 Rheometer.

The temperature-resistant and pressure-resistant foaming device is purchased from Jiangsu Tuochuang Scientific Research Instrument Co., Ltd., and the trade name is TCPMPJ-II High Temperature and High Pressure Foam Visualization System, which includes a temperature-resistant and pressure-resistant autoclave and a sapphire glass window, and the temperature-resistant and pressure-resistant autoclave is heated by an electric heating jacket, the inner diameter of the temperature-resistant and pressure-resistant autoclave is 50 mm and the height of the autoclave is 400 mm; the top of the temperature-resistant and pressure-resistant autoclave is equipped with a back pressure device to control the pressure inside the autoclave, and the bottom of the autoclave is equipped with a porous medium emulsifying device, and finally, when forming the fracturing and displacement fluid, it is necessary to first add the gelatinized fluid into the temperature-resistant and pressure-resistant autoclave, then the pressure and temperature of the system is controlled through the temperature-resistant and pressure-resistant autoclave, and the liquid or supercritical $CO_2$ is pumped into the temperature-resistant and pressure-resistant autoclave.

Example 1

4 g of erucoylamidopropyl hydroxysulfobetaine, 1.2 g of N,N,N',N'-tetramethyl-1,3-propanediamine, 0.5 g of sodium p-toluenesulfonate, 0.5 g of sodium bis(2-ethylhexyl)sulfosuccinate are added to a beaker, and ultrapure water is added until 100 g; the formed solution is heated to 20° C. in a water bath and stirred for 20 min until evenly mixed to obtain a zwitterionic base fluid. $CO_2$ in a gaseous state is introduced into the obtained zwitterionic base fluid at a rate of 8 mL·min$^{-1}$ until the system is uniformly gelatinized and clear and transparent, and then the obtained mixture is allowed to stand for 24 hours or above until bubbles in the gelatinized fluid disappear, so that the gelatinized fluid F1 is obtained; the obtained gelatinized fluid F1 is poured into the temperature-resistant and pressure-resistant autoclave in the temperature-resistant and pressure-resistant foaming device, and under 35° C. and 10 MPa, $CO_2$ in a liquid state is re-introduced into the gelatinized fluid F1 through the bottom of the gelatinized fluid F1 at a flow rate of 20 ml·min$^{-1}$ until no foam is formed any longer, so that the fracturing and displacement fluid A1 (containing 3.4 wt % of erucoylamidopropyl hydroxysulfobetaine, 1.0 wt % of N,N,N',N'-tetramethyl-1,3-propanediamine, 0.4 wt % of sodium p-toluenesulfonate, 0.4 wt % of sodium bis(2-ethylhexyl)sulfosuccinate, 14.8 wt % of $CO_2$ and 80.0 wt % of water) is obtained, and $CO_2$ in the fracturing and displacement fluid A1 is in a supercritical state.

Example 2

2.23 g of sodium octadecyl sulfonate, 2.1 g of N,N-dimethylpropanolamine, 0.3 g of octylphenyl polyoxyethylene ether (TX-100) are added to a beaker, and ultrapure water is added until 100 g; the formed solution is heated to 50° C. in a water bath and stirred for 5 minutes until evenly mixed to obtain an anionic base fluid. $CO_2$ in a gaseous state is introduced into the obtained anionic base fluid at a rate of 10 mL·min$^{-1}$ until the system is uniformly gelatinized and clear and transparent, and then the formed mixture is allowed to stand for 24 hours or above until bubbles in the gelatinized fluid disappear, so that the gelatinized fluid F2 is obtained; the obtained gelatinized fluid F2 is poured into the temperature-resistant and pressure-resistant pressure autoclave in the temperature-resistant and pressure-resistant foaming device; and under 32° C. and 8.5 MPa, $CO_2$ in a liquid state is re-introduced into the gelatinized fluid F2 through the bottom of the gelatinized fluid F2 at a flow rate of 10 ml·min$^{-1}$ until no foam is formed any longer, so that the fracturing and displacement fluid A2 (containing 2.1 wt % of sodium octadecyl sulfonate, 1.9 wt % of N,N-dimethylpropanolamine, 0.3 wt % of TX-100, 17.4 wt % of $CO_2$ and 78.3 wt % of water) is obtained, and the $CO_2$ in the fracturing and displacement fluid A2 is in a liquid state.

Example 3

2.11 g of erucoylamidopropyl dimethylamine, 0.4 g of sodium maleate, 0.35 g of fluorocarbon surfactant are added to a beaker, and ultrapure water is added until 100 g, and the formed solution is heated to 40° C. in a water bath and stirred for 8 min until evenly mixed to obtain a nonionic base fluid. $CO_2$ in a gaseous state is introduced into the obtained nonionic base fluid at a rate of 12 mL·min$^{-1}$ until the system is uniformly gelatinized and clarified and transparent, and then the formed mixture is allowed to stand for 24 hours or above until bubbles in the gelatinized fluid disappear, so that the gelatinized fluid F3 is obtained; the obtained gelatinized fluid F3 is poured into the temperature-resistant pressure-resistant autoclave in the temperature-resistant and pressure-resistant foaming device; and under 25° C. and 10 MPa, and $CO_2$ in a liquid state is re-introduced into the gelatinized fluid F3 through the bottom of the forming liquid F3 at a flow rate of 15 ml·min$^{-1}$ until no foam is formed any longer, so that the fracturing displacement liquid A3 (containing 2.1 wt % of erucoylamidopropyl dimethylamine, 0.4 wt % of sodium maleate, 0.3 wt % of fluorocarbon surfactant, 12.6 wt % of $CO_2$ and 84.6 wt % of water) is obtained, and the $CO_2$ in the fracturing and displacement fluid A3 is in a liquid state.

Example 4

A $CO_2$-sensitive fracturing and displacement fluid A4 is prepared in accordance with the method of Example 1, except that the dosage of erucoylamidopropyl hydroxysulfobetaine is 12 g, so that the $CO_2$-sensitive fracturing and displacement fluid A4 (containing 11.7 wt % of erucoylamidopropyl hydroxysulfobetaine, 1.2 wt % of N,N,N',N'-tetramethyl-1,3-propanediamine, 0.5 wt % of sodium p-toluenesulfonate, 0.5 wt % of sodium bis(2-ethylhexyl)sulfosuccinate, 12.8 wt % of $CO_2$ and 73.4 wt % of water) is obtained, and the $CO_2$ in the fracturing and displacement fluid A4 is in a supercritical state.

Example 5

The $CO_2$-sensitive fracturing and displacement fluid A5 is prepared according to the method of Example 1, except that $CO_2$ in a liquid state is introduced into the obtained zwitterionic base fluid at a rate of 25 mL·min$^{-1}$ until the system is uniformly gelatinized and clear and transparent, and the formed mixture is allowed to stand for 24 hours or above until bubbles in the gelatinized fluid disappear, so that the gelatinized fluid F5 is obtained, and the obtained gelatinized fluid F5 is poured into the temperature-resistant and pressure-resistant autoclave in the temperature-resistant and pressure-resistant foaming device; and under 35° C. and 10 MPa, $CO_2$ in a liquid state is re-introduced into the gelatinized fluid F1 through the bottom of the gelatinized fluid F1 at a flow rate of 20 ml·min$^{-1}$ until no foam is formed any longer, and the fracturing and displacement fluid A5 (containing 3.8 wt % of erucoylamidopropyl hydroxysulfobetaine, 1.1 wt % of N,N,N',N'-tetramethyl-1,3-propanediamine, 0.5 wt % of sodium p-toluenesulfonate, 0.5 wt % of sodium bis(2-ethylhexyl)sulfosuccinate, 14.4 wt % of $CO_2$ and 79.7 wt % of water) is obtained, and the $CO_2$ in the fracturing and displacement fluid A5 is in a supercritical state.

Example 6

A $CO_2$-sensitive fracturing displacement A6 is prepared according to the method of Example 1 except that the same weight of behenyl betaine is used instead of erucoylamidopropyl hydroxysulfobetaine, so that the $CO_2$-sensitive fracturing and displacement fluid A6 (containing 3.8 wt % of behenyl betaine, 1.1 wt % of N,N,N',N'-tetramethyl-1,3- propanediamine, 0.5 wt % of sodium p-toluenesulfonate, 0.5 wt % of sodium bis(2-ethylhexyl)sulfosuccinate, 14.4 wt % of $CO_2$ and 79.7 wt % of water) is obtained, and the $CO_2$ in the fracturing and displacement fluid A6 is in a supercritical state.

Example 7

A $CO_2$-sensitive fracturing and displacement fluid A7 is prepared according to the method of Example 2 except that the same weight of sodium lauryl polyoxyethylene ether sulfate is used instead of sodium octadecylsulfonate, and the same weight of N,N-dimethyl-p-phenylenediamine is used instead of N,N-dimethylpropanolamine, so that the $CO_2$-sensitive fracturing and displacement fluid A7 (containing 2.2 wt % of sodium lauryl polyoxyethylene ether sulfate, 2.0 wt % of N,N-dimethyl-p-phenylenediamine, 0.3 wt % of TX-100, 12.5 wt % of $CO_2$ and 83.0 wt % of water) is obtained, and the $CO_2$ in the fracturing and displacement fluid A7 is in a liquid state.

Example 8

A $CO_2$-sensitive fracturing and displacement fluid A8 is prepared according to the method of Example 3 except that the same weight of dodecyltetramethylguanidine is used instead of erucoylamidopropyl dimethylamine, and the same weight of sodium salicylate is used instead of sodium maleate, and the same weight of sodium bis(2-ethylhexyl)sulfosuccinate is used instead of the fluorocarbon surfactant, so that the $CO_2$-sensitive fracturing and displacement fluid A8 (containing 2.1 wt % of dodecyltetramethylguanidine, 0.4 wt % of sodium salicylate, 0.3 wt % of sodium bis(2-ethylhexyl)sulfosuccinate, 11.3 wt % of $CO_2$ and 85.9 wt % of water) is obtained, and the $CO_2$ in the fracturing and displacement fluid A8 is in a liquid state.

Example 9

A $CO_2$-sensitive fracturing and displacement fluid A9 is prepared according to the method of Example 1, except that sodium bis(2-ethylhexyl)sulfosuccinate is not added to obtain the $CO_2$-sensitive fracturing and displacement fluid A9 (containing 4.0 wt % of erucoylamidopropyl hydroxysulfobetaine, 1.2 wt % of N,N,N',N'-tetramethyl-1,3-propanediamine, 0.5 wt % of sodium p-toluenesulfonate, 11.1 wt % of $CO_2$ and 83.2 wt % of water), and the $CO_2$ in the fracturing and displacement fluid A9 is in a supercritical state.

Example 10

A $CO_2$-sensitive fracturing and displacement fluid A10 is prepared according to the method of Example 1, except that the amount of N,N,N',N'-tetramethyl-1,3-propanediamine is 4.8 g, so that the $CO_2$-sensitive fracturing and displacement fluid A10 (containing 3.9 wt % of erucoylamidopropyl hydroxysulfobetaine, 4.7 wt % of N,N,N',N'-tetramethyl-1,3-propanediamine, 0.5 wt % of sodium p-toluenesulfonate, 0.5 wt % of sodium bis(2-ethylhexyl)sulfosuccinate, 12.2 wt % of $CO_2$ and 78.2 wt % of water) is obtained, and the $CO_2$ in the fracturing and displacement fluid A1 is in a super-critical state.

Comparative Example 1

The $CO_2$-sensitive fracturing and displacement fluid D1 is prepared according to the method of Example 1, except that $CO_2$ in a gaseous state is introduced into the zwitterionic base fluid under the same conditions until the system is uniformly gelatinized and clarified and transparent, and the formed mixture is allowed to stand for 24 hours or above until bubbles in the aforementioned gelatinized fluid disappear, so that the gelatinized fluid F1 is obtained; neither is the obtained gelatinized fluid F1 poured into the temperature and pressure resistant foaming device nor the $CO_2$ is re-introduced into the gelatinized fluid F1, so that the fracturing and displacement fluid D1 (containing 4.0 wt % of erucoylamidopropyl hydroxysulfobetaine, 1.2 wt % of N,N,N',N'-tetramethyl-1,3-propanediamine, 0.5 wt % of sodium p-toluenesulfonate, 0.5 wt % of sodium bis(2-ethylhexyl) sulfosuccinate, 0 wt % of $CO_2$ and 93.8 wt % of water) is obtained.

Comparative Example 2

The $CO_2$-sensitive fracturing and displacement fluid D2 is prepared according to the method of Example 1, except that the anionic cosurfactant sodium p-toluenesulfonate is not added, and the dosage of the nonionic cosurfactant N,N,N',N'-tetramethyl-1,3-propanediamine is 1.7 g, so that the fracturing and displacement fluid D2 (containing 3.4 wt % of erucoylamidopropyl hydroxysulfobetaine, 1.4 wt % of sodium p-toluenesulfonate, 0.4 wt % of sodium bis(2-ethylhexyl)sulfosuccinate, 14.8 wt % of $CO_2$ and 80.0 wt % of water) is obtained, and the $CO_2$ in the fracturing and displacement fluid D2 is in a supercritical state.

Comparative Example 3

The $CO_2$-sensitive fracturing and displacement fluid D3 is prepared according to the method of Example 2, except that the dosage of N,N-dimethylpropanolamine is 10.5 g, and the dosage of octylphenyl polyoxyethylene ether (TX-100) is 1.5 g, so that the fracturing and displacement fluid D3 (containing 2.1 wt % of sodium octadecyl sulfonate, 9.7 wt % of N,N-dimethylpropanolamine, 1.4 wt % of TX-100, 17.4 wt % of $CO_2$ and 69.4 wt % of water) is obtained, and the $CO_2$ in the fracturing and displacement fluid D3 is in a liquid state.

Comparative Example 4

The fracturing and displacement fluid D4 is prepared according to the method of Example 3, except that the dosage of erucoylamidopropyl dimethylamine is 16 g, so that the fracturing displacement liquid D4 (containing 15.6 wt % of erucoylamidopropyl dimethylamine, 0.4 wt % of sodium maleate, 0.3 wt % of fluorocarbon surfactant, 12.6 wt % of $CO_2$ and 71.1 wt % of water) is obtained, and the $CO_2$ in the fracturing and displacement fluid D4 is in a liquid state.

Comparative Example 5

The $CO_2$-sensitive fracturing and displacement fluid D5 is prepared according to the method of Example 1, except that the dosage of N,N,N',N'-tetramethyl-1,3-propanediamine is 1.2 g, and the dosage of sodium p-toluenesulfonate is 6 g, so that the fracturing displacement liquid D5 (containing 3.8 wt % of erucoylamidopropyl hydroxysulfobetaine, 1.1 wt % of N,N,N',N'-tetramethyl-1,3-propanediamine, 5.7 wt % of sodium p-toluenesulfonate, 0.5 wt % of sodium bis(2-ethylhexyl)sulfosuccinate, 5.5 wt % of $CO_2$ and 83.4 wt % of water) is obtained, and $CO_2$ in the fracturing and displacement fluid D5 is in a supercritical state.

Comparative Example 6

The fracturing and displacement fluid D6 is prepared according to the method of Example 1, except that the dosage of N,N,N',N'-tetramethyl-1,3-propanediamine is 3 g, and the dosage of sodium p-toluenesulfonate is 8 g, so that the fracturing and displacement fluid D6 (containing 3.4 wt % of erucoylamidopropyl hydroxysulfobetaine, 2.6 wt % of N,N,N',N'-tetramethyl-1,3-propanediamine, 6.8 wt % of sodium p-toluenesulfonate, 0.4 wt % of sodium bis(2-ethylhexyl)sulfosuccinate, 14.8 wt % of $CO_2$ and 72.0 wt % of water) is obtained, and $CO_2$ in the fracturing and displacement fluid D6 is in a supercritical state.

Test Example (1) Microstructure

Figure 2:
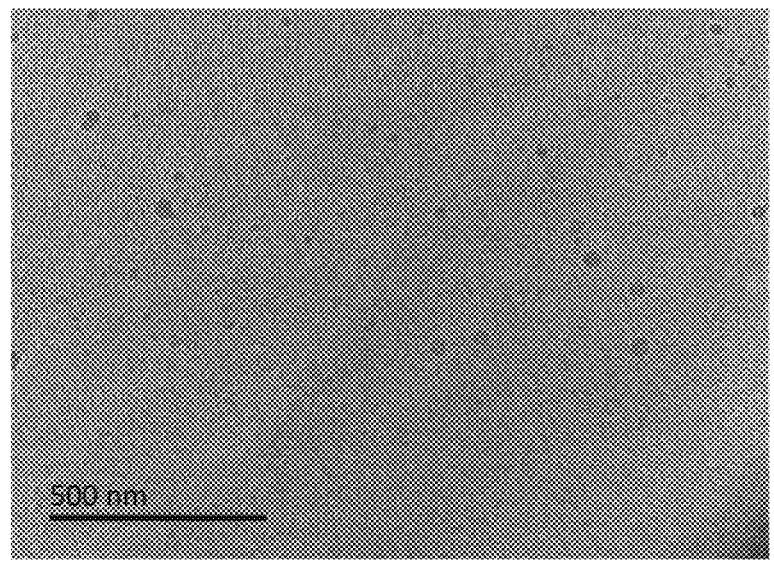
FIG. 2 is a freeze-etching electron micrograph of gelatinized fluid F1 in Example 1.

The gelatinized fluid F1 in Example 1 is subjected to freeze-etching electron microscopy characterization, and the freeze-etching electron micrograph is shown in FIG. 2. As can be seen from FIG. 2, the gelatinized fluid F1 has a distinct spatial network structure.

(2) Rheological Properties (2-1) Steady-State Shear Viscosity and Viscoelasticity at Room Temperature and Normal Pressure (25° C., 101.3 kPa)

Figure 3:
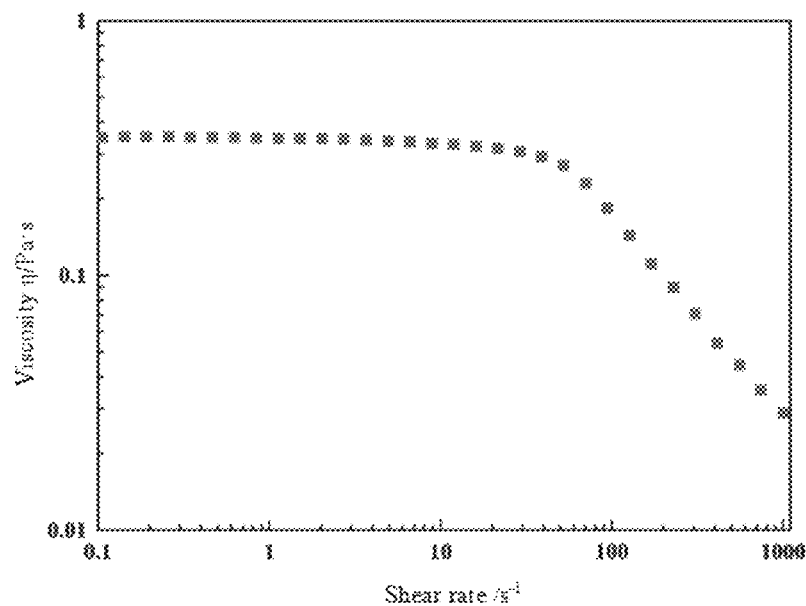
FIG. 3 is a graph showing the relationship between the shear viscosity and the shear rate of gelatinized fluid F1 in Example 1.
Figure 4:
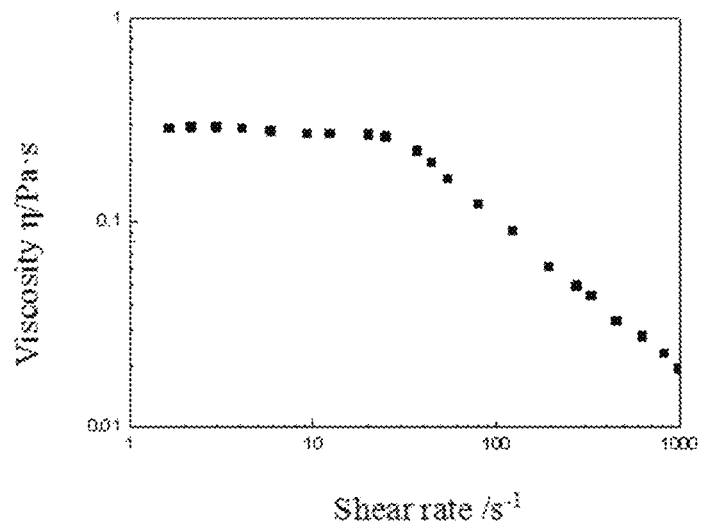
FIG. 4 is a graph showing the relationship between the shear viscosity and the shear rate of gelatinized fluid F2 in Example 2.
Figure 5:
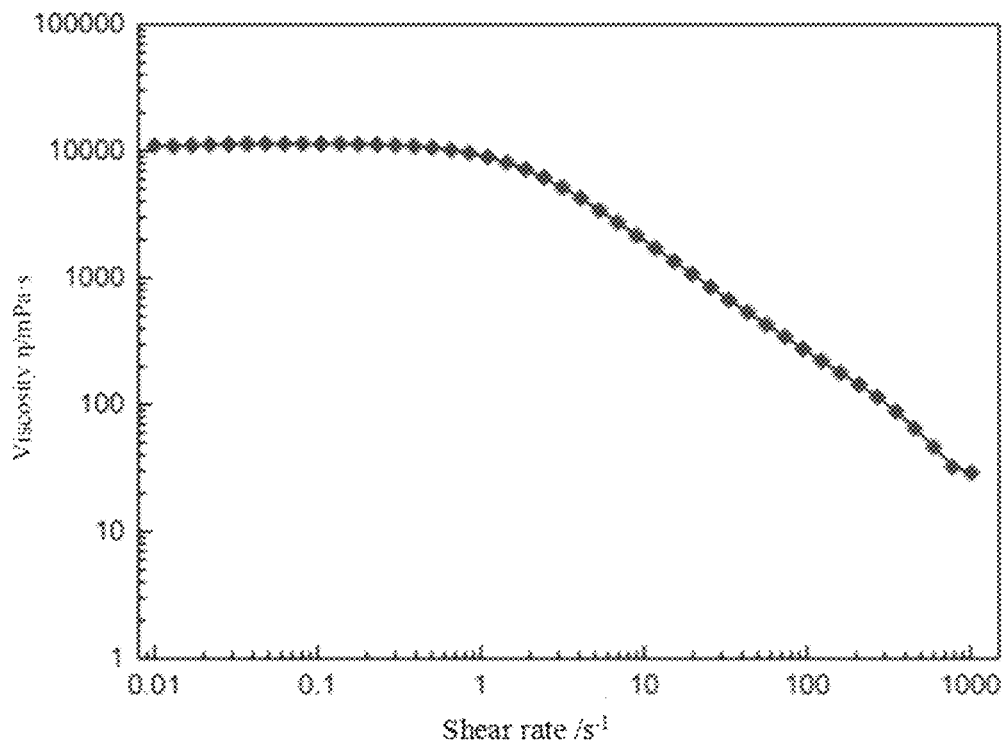
FIG. 5 is a graph showing the relationship between the shear viscosity and the shear rate of gelatinized fluid F3 in Example 3.

50 mL of the gelatinized fluid F1-F3 samples of Examples 1-3 are separately weighed, and the variation results of the shear viscosity of the sample gelatinized fluid F1 with the shear rate (0.1-100 $s^{-1}$) by using an open coaxial drum module in the rheometer are shown in FIG. 3, the variation results of the shear viscosity of the sample gelatinized fluid F2 with the shear rate (0.1-100 $s^{-1}$) are shown in FIG. 4, and the variation results of the shear viscosity of the sample gelatinized fluid F3 with the shear rate (0.1-100 $s^{-1}$) are shown in FIG. 5.

It can be seen from FIG. 3 to FIG. 5 that the viscosity of the sample gelatinized fluids F1-F3 is not related to the shear rate under low shear, which shows the characteristics of Newtonian fluid, and the obvious shear thinning phenomenon occurs under high shear, indicating that a wormlike micelle is formed in the sample gelatinized fluid F1-F3 system.

Figure 6:
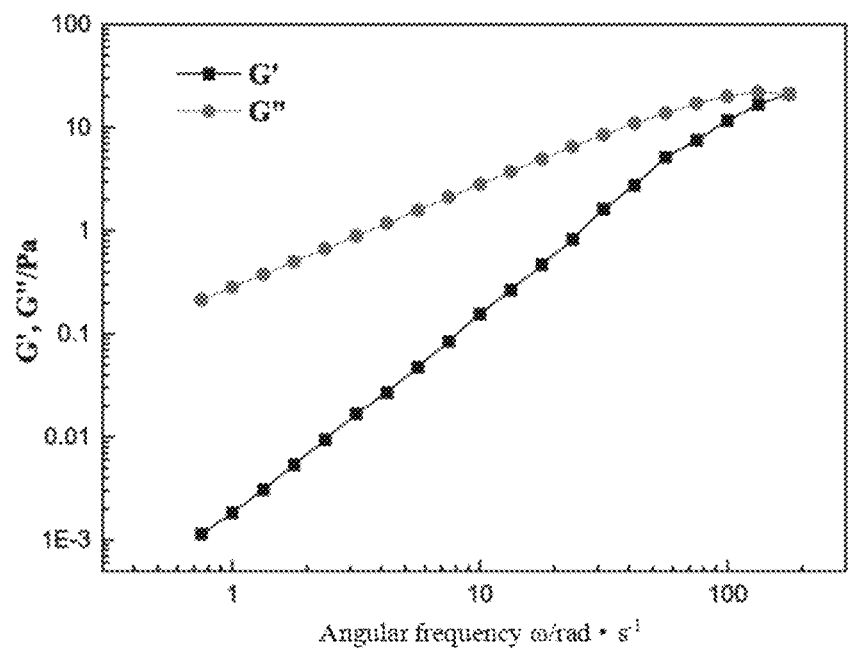
FIG. 6 is a graph showing the relationship between the viscoelastic modulus and the angular frequency of gelatinized fluid F1 in Example 1.

50 mL of sample gelatinized fluid F1 is weighed, and an open coaxial drum module in the rheometer is used to test the variation of the elastic modulus (G') and the viscous modulus (G") of the sample gelatinized fluid F1 with the angular frequency (0.01-10 rad·$s^{-1}$), and the results are shown in FIG. 6.

It can be seen from FIG. 6 that the viscoelasticity of the sample gelatinized fluid F1 conforms to the Maxwell's law, indicating that a wormlike micelle is formed in the gelatinized fluid F1 system.

(2-2) Temperature-Resistant and Shear-Resistant Viscosity at Medium Temperature and High Pressure (55-80° C., 3 MPa)

Figure 7:
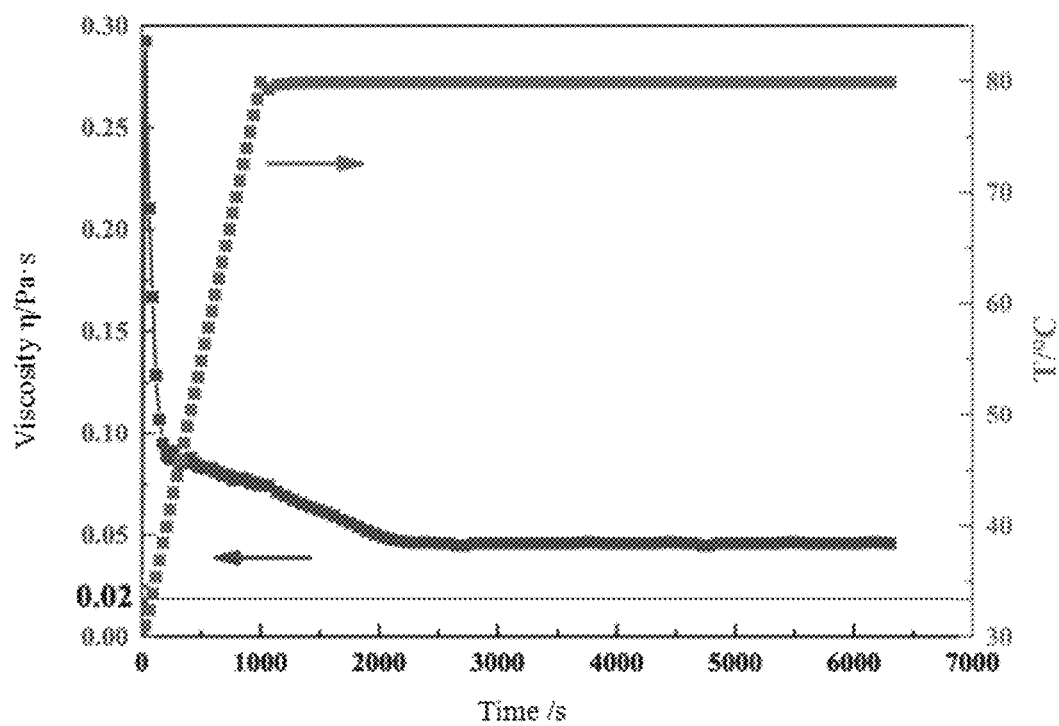
FIG. 7 is a graph showing the variation of the medium-temperature high-pressure viscosity of the $CO_2$-sensitive fracturing and displacement fluid A1 prepared in Example 1 at 170 $s^{-1}$ and 80° C. with the shear time.
Figure 8:
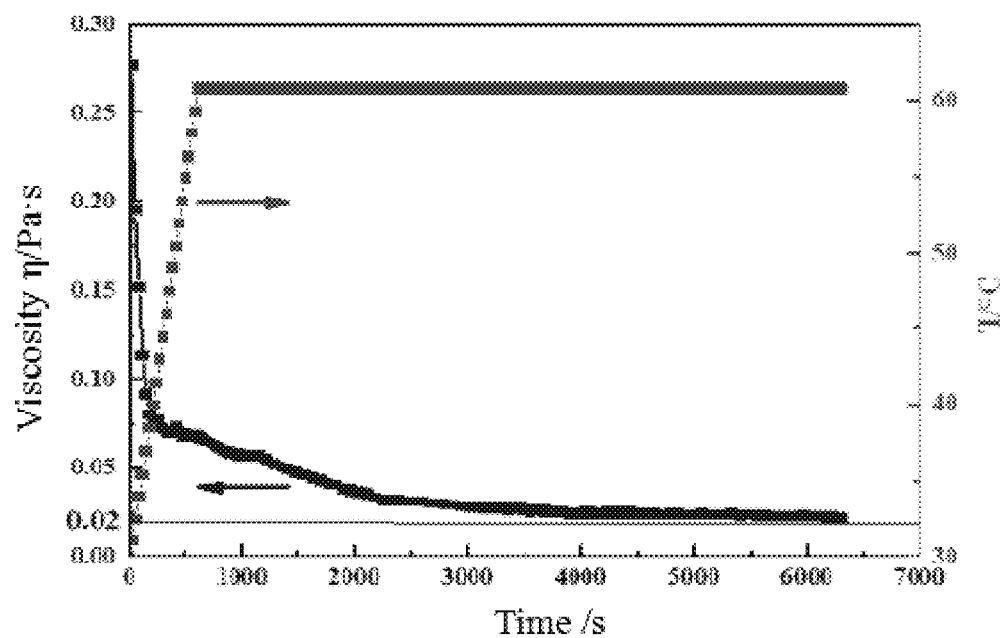
FIG. 8 is a graph showing the variation of the medium-temperature high-pressure viscosity of the $CO_2$-sensitive fracturing and displacement fluid A2 prepared in Example 2 at 170 $s^{-1}$ and 60° C. with the shear time.
Figure 9:
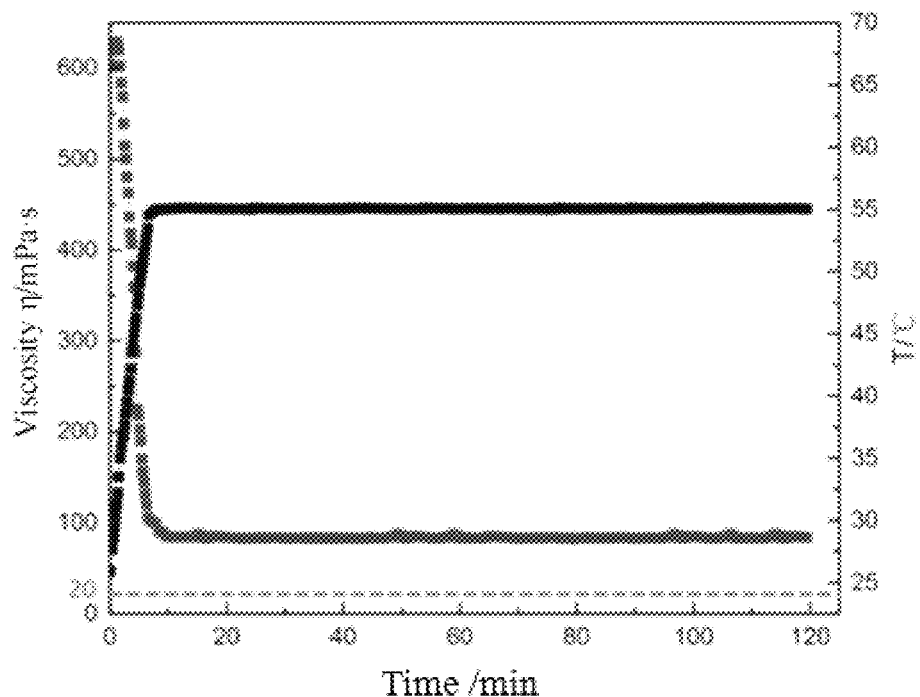
FIG. 9 is a graph showing the variation of the medium-temperature high-pressure viscosity of the $CO_2$-sensitive fracturing and displacement fluid A3 prepared in Example 3 at 170 $s^{-1}$ and 55° C. with the shear time.
Figure 10:
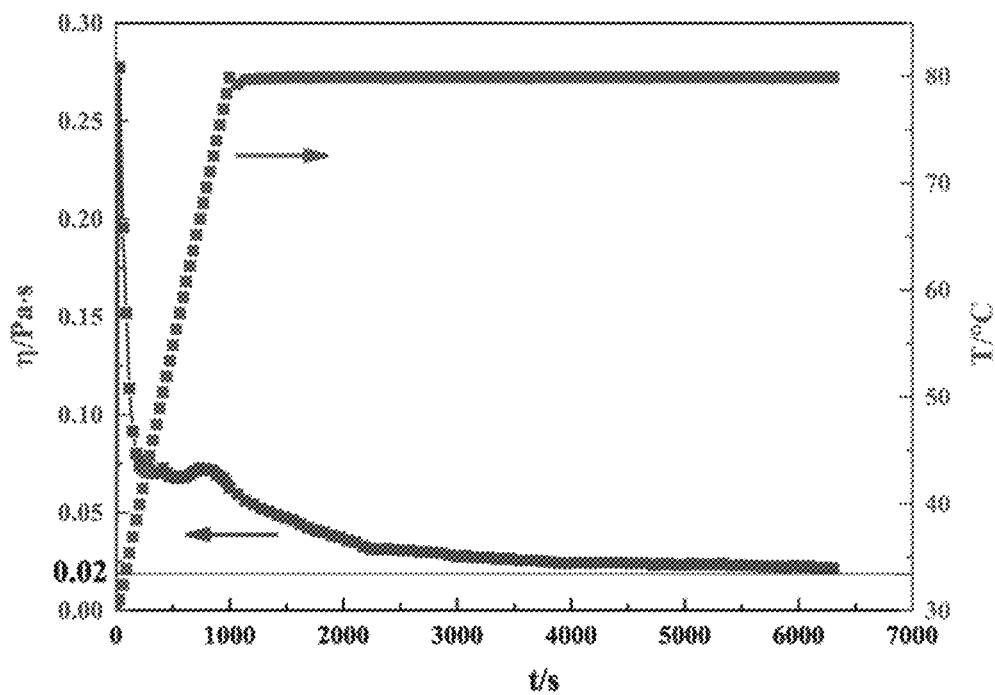
FIG. 10 is a graph showing the variation of the medium-temperature high-pressure viscosity of the $CO_2$-sensitive fracturing and displacement fluid D1 prepared in Comparative Example 1 at 170 $s^{-1}$ and 80° C. with the shear time.

50 mL of $CO_2$-sensitive fracturing and displacement fluid A1-A3 samples are weighed, and the medium-temperature high-pressure module of the rheometer is used to subject the samples A1-A3 and D1 to a test for temperature-resistant and shear-resistant performance under the pressure of 3 MPa; as for test conditions, the shear rate is 170 $s^{-1}$, shearing is performed for 1.75 h. The variation of the shear viscosity (referred to as medium-temperature and high-pressure viscosity) of the sample A1 at 80° C. with the shear time is shown in FIG. 7; the variation of the medium-temperature and high-pressure viscosity of the sample A2 at 60° C. with the shear time is shown in FIG. 8; the variation of the medium-temperature high-pressure viscosity of the sample A3 at 55° C. with the shear time is shown in FIG. 9; the variation of the viscosity of the sample D1 with the shear time at 80° C. under the conditions of medium temperature and high pressure is shown in FIG. 10.

It can be seen from FIG. 7 to FIG. 10 that the $CO_2$-sensitive fracturing and displacement fluid A1-A3 and D1 systems have a viscosity of more than 20 mPa·s after shearing for 1.75 h at 170 $s^{-1}$ under the conditions of medium temperature and high pressure, which meets the requirements of fracturing construction.

50 mL of $CO_2$-sensitive fracturing and displacement fluids A1-A10 and D1-D6 are weighed respectively, the shear viscosities of samples A1-A10 and D1-D6 after shearing for 1.75 h at 170 $s^{-1}$ under the conditions of medium temperature and high pressure are measured by the medium-temperature high-pressure module, which is referred to as medium-temperature and high-pressure viscosity, and the results are shown in Table 1.

(3) Sand-Carrying Performance Under Room Temperature and Normal Pressure (25° C., 101.3 kPa)

The $CO_2$-sensitive fracturing and displacement fluids A1-A10 and D1-D6 are tested for static sand-carrying performance by a falling ball method, and the test conditions are as follows: ① the prepared $CO_2$-sensitive fracturing and displacement fluids A1-A10 and D1-D6 and 50-mesh ceramsite are thoroughly mixed respectively according to the sand addition concentration of 250 g/L; ② 100 mL of the sample from the obtained mixture is added to a measuring cylinder of 100 mL and sealed, and placed at room temperature (25° C.) for observation; ③ the height of the ceramsite deposited at the bottom of the measuring cylinder is recorded every 5 minutes, and the settling velocity (settling velocity=deposited ceramsite height/settling time) is calculated; ④ the step 3 is repeated until 2 hours, and the average settling velocity of the ceramsite is calculated. The effect of the sand-carrying performance of the fracturing and displacement fluid A1 at 25° C. and 101.3 kPa is shown in FIG. 11, and the test results of the fracturing and displacement fluids A1-A10 and D1-D6 are shown in Table 1.

Figure 11:
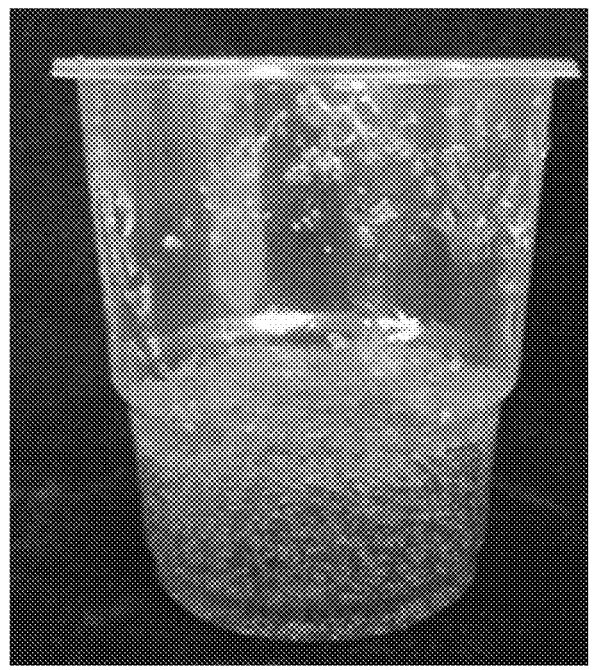
FIG. 11 is a graph showing the effect of the sand carrying performance of the $CO_2$-sensitive fracturing and displacement fluid A1 prepared in Example 1 at 25° C. and 101.3 kPa.

As can be seen from FIG. 11, the $CO_2$-sensitive fracturing and displacement fluid A2 has good sand-carrying performance.

(4) Imbibition and Oil Discharge Capacity Under Medium Temperature and High Pressure (80° C., 3 MPa)

Figure 12:
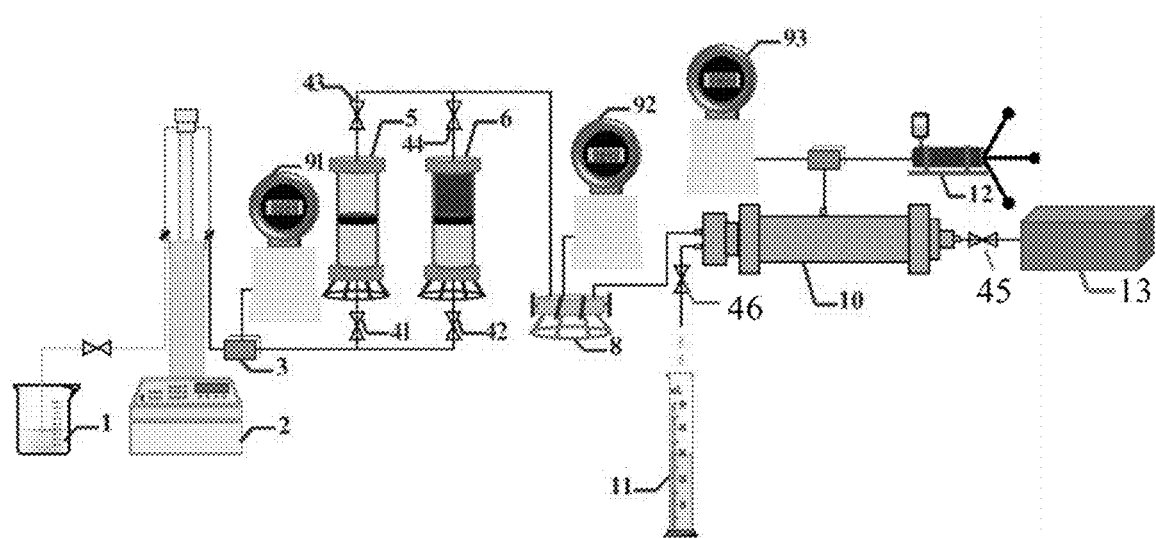
FIG. 12 is a schematic view of a simulation device for performing an imbibition and oil displacement capability test on $CO_2$-sensitive fracturing and displacement fluid.
Figure 13:
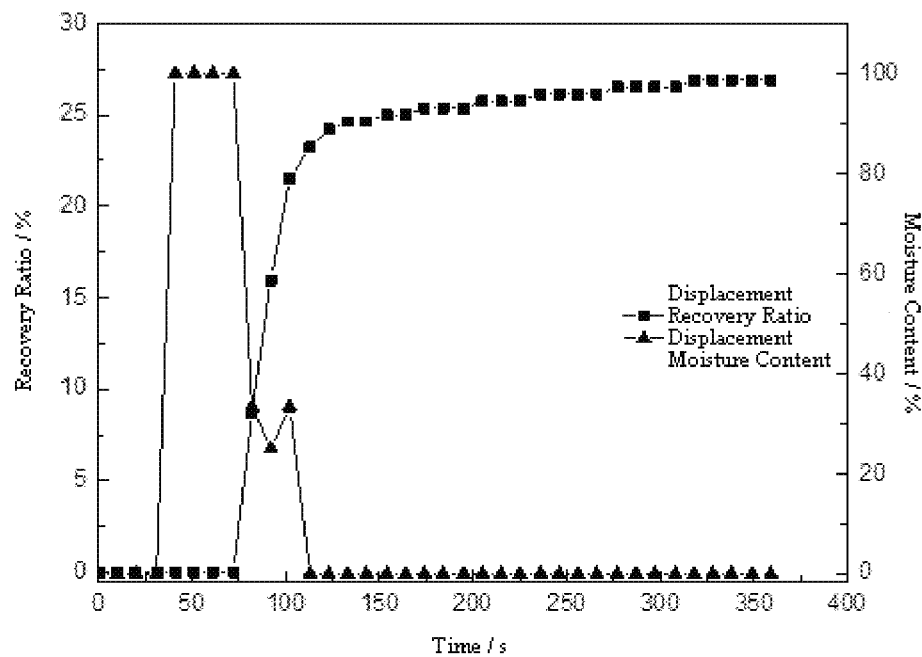
FIG. 13 is a diagram showing the displacement effect of the $CO_2$-sensitive fracturing and displacement fluid A1 prepared in Example 1.
Figure 14:
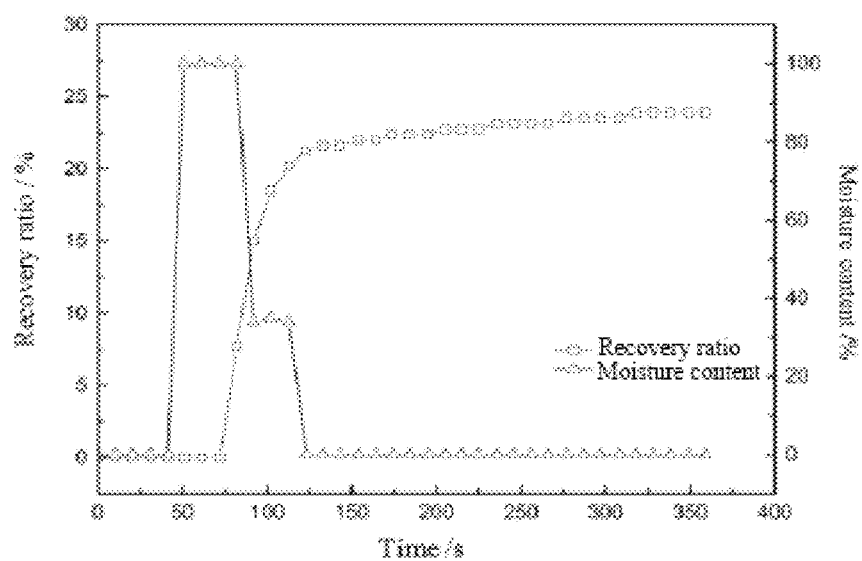
FIG. 14 is a diagram showing the displacement effect of the $CO_2$-sensitive fracturing and displacement fluid A2 prepared in Example 2.
Figure 15:
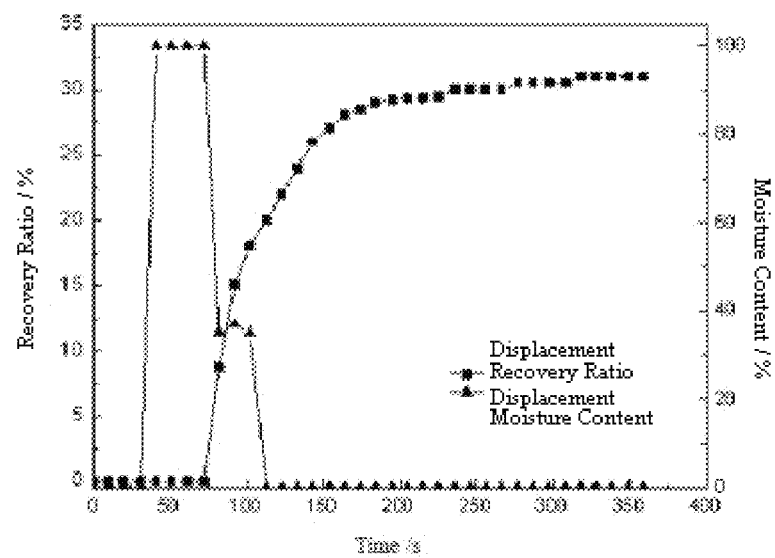
FIG. 15 is a diagram showing the displacement effect of the $CO_2$-sensitive fracturing and displacement fluid A3 prepared in Example 3.
Figure 16:
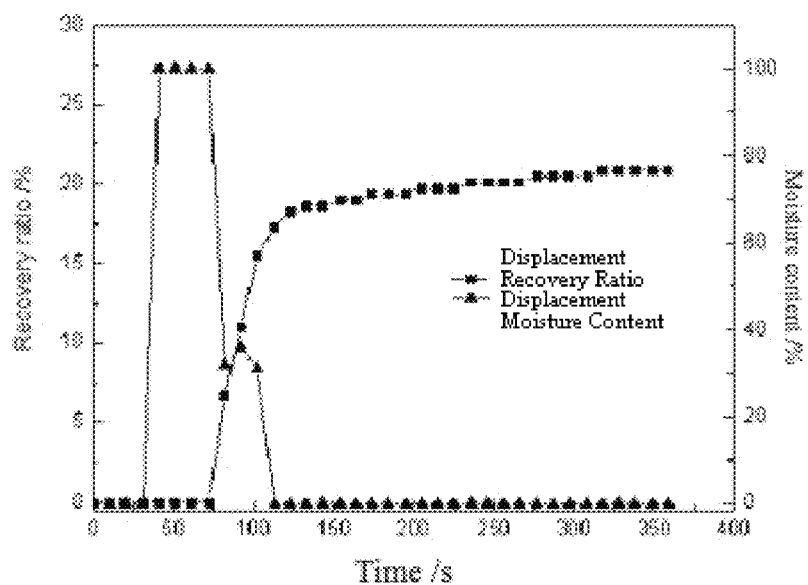
FIG. 16 is a diagram showing the displacement effect of the $CO_2$-sensitive fracturing and displacement fluid D1 prepared in Comparative Example 1.

The simulation device is used to simulate the depletion production, and the imbibition recovery rate of the $CO_2$-sensitive fracturing and displacement fluids A1-A10 and D1-D6 is calculated by the discharging oil volume metering method, and the volume of the imbibition and oil discharge is obtained at different times. The simulation device is as shown in FIG. 12, the simulation device includes a first intermediate container 5, a second intermediate container 6, and a core holder 10 which sequentially communicate with one another, wherein the first intermediate container 5 and the second intermediate container 6 and the core holder 10 are placed in a constant temperature oven for monitoring, controlling and maintaining the temperatures required for the first intermediate container 5, the second intermediate container 6 and the core holder 10; the simulation device also includes a beaker 1, and a material conveying pipeline is disposed between the beaker 1 and the first intermediate container 5, and an advection pump 2 and a three-way valve 3 are sequentially disposed on the material conveying pipeline along the material flow direction in the material conveying pipeline; a first injection valve 41 and a second injection valve 42 are separately disposed at the material inlet of the first intermediate container 5 and the material inlet of the second intermediate container 6; a first discharge valve 43 and a second discharge valve 44 are separately disposed at the material outlet of the first intermediate container 5 and the material outlet of the second intermediate container 6; the first injection valve 41, the second injection valve 42, the first discharge valve 43, and the second discharge valve 44 are used to regulate the input and output of materials in the first intermediate container 5 and the second intermediate container 6, respectively. The three-way valve 3 disposed on the material conveying pipeline between the beaker 1 and the first intermediate container 5 includes an inlet, an outlet, and a reversing port; the inlet of the three-way valve 3 interconnects with an outlet of the advection pump 2; the outlet of the three-way valve 3 interconnects with the first injection valve 41; the reversing port of the three-way valve 3 interconnects with a first pressure gauge 91; the first pressure gauge 91 is used to monitor the pressure in the material conveying pipeline. A six-way valve 8 is also disposed between the second intermediate container 6 and the core holder 10, and the six-way valve 8 is used to regulate the loading or injection connectivity mode between the material flowing out of the first intermediate container 5 and/or the second intermediate container 6 and the core holder 10. The six-way valve 8 is also connected to a second pressure gauge 92 for regulating the injection pressure of the sample injected into the core holder 10. The beaker 1 is used for containing ultrapure water, the first intermediate container 5 is used for containing the $CO_2$-sensitive fracturing and displacement fluid and encapsulated gel breaker, and the second intermediate container 6 is used for containing a simulated oil (the viscosity at 50° C. is 5.26 mPa·s, the interfacial tension with the formation water is 15.5 mN/m, the viscosity at 80° C. is 2.32 mPa·s, and the interfacial tension with the formation water is 16.3 mN/m). The core holder 10 is equipped with a simulated rock sample (the simulated oil is saturated by vacuum pressurization), wherein the core diameter is 25 mm, the core length is 100 mm, the porosity is 15.8-24.4%, and the gas permeability of the core is 0.20-0.35 mD. A measuring cylinder 11 is further disposed at the outlet of the core holder 10 for receiving the discharged oil generated after an displacement test by the core holder 10 and recording the volume of the discharged oil, thereby calculating the degree of imbibition recovery (a recovery ratio). The core holder 10 is connected to a third pressure gauge 93 and a hand pump 12 for monitoring and controlling the pressure in the core holder 10 to be maintained at a desired simulated pressure. A produced fluid control valve 46 is further disposed at the outlet pipeline of the core holder 10, served as a switch for controlling the discharged oil generated after the displacement test by the core holder 10. An axial pressure control valve 45 and an axial pressure controller 13 are also disposed on the right side pipeline of the core holder 10 for controlling the axial pressure when the core holder 10 is used to perform the displacement test.

When the simulation device is started to perform the depletion production simulation, the advection pump 2 injects the simulated oil in the second intermediate container 6 into the core holder 10 at a flow rate of 0.5 mL/min, and keep the core holder 10 is maintained at the axial pressure of 1 MPa and the confining pressure of 2.5-3.5 MPa, then the second injection valve 42 and the second discharge valve 44 are switched off, and the first injection valve 41 and the first discharge valve 43 are switched on, and the $CO_2$-sensitive fracturing and displacement fluid and the encapsulated gel breaker in the second intermediate container 6 are injected into the core holder 10 at a flow rate of 0.5 mL/min, wherein the dosage of the encapsulated gel breaker is 10 wt %, and the content of the active ingredient of ammonium persulfate in the encapsulated gel breaker is not less than 75 wt %, with respect to the total weight of the $CO_2$-sensitive fracturing and displacement fluid. The core holder 10 is maintained at an axial pressure of 3 MPa, and a confining pressure of 4.5-5.5 MPa, and the temperature within the core holder 10 is controlled to be 80° C. After maintaining the soak state for 240 hours, the produced fluid control valve 46 on the outlet pipeline of the core holder 10 is switched on, and the measuring cylinder 11 is used to receive the discharged oil produced after a displacement test by the core holder 10 and record the volume of the discharged oil obtained at different times.

The recovery rates of $CO_2$-sensitive fracturing and displacement fluid samples A1-A3 and D1 are tested as the above-mentioned method respectively, and the results are shown in FIG. 13-16.

Figure 17:
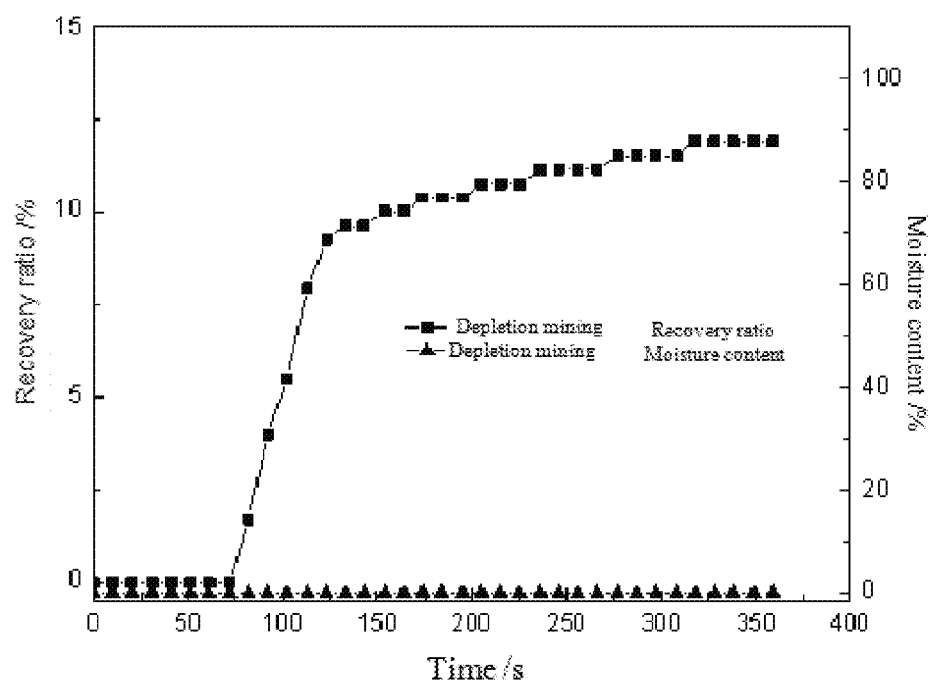
FIG. 17 is a graph showing the recovery effect of depletion production simulation of a sample not injected with $CO_2$-sensitive fracturing and displacement fluid.

The recovery ratio of the blank matrix-fractured core is tested as the method described above, except that no $CO_2$-sensitive fracturing and displacement fluid samples are injected during the test, and the results are shown in FIG. 17.

The recovery rates of the $CO_2$-sensitive fracturing and displacement fluid samples A1-A10 and D1-D6 are tested and the results are shown in Table

TABLE 1

| No. | Viscosity after shearing for 1.75 h/mPa · s | Falling ball method average settling speed/mm/s | Recovery rate/% |
|---|---|---|---|
| A1 | 274 (80° C.) | 0.53 | 27.1 |
| A2 | 262 (60° C.) | 0.55 | 23.4 |
| A3 | 448.5 (55° C.) | 0.56 | 31.1 |
| A4 | 273 (80° C.) | 0.56 | 26.2 |
| A5 | 272 (80° C.) | 0.63 | 26.1 |
| A6 | 271 (80° C.) | 0.65 | 26.8 |
| A7 | 258 (60° C.) | 0.66 | 21.7 |
| A8 | 441 (55° C.) | 0.62 | 30.2 |
| A9 | 265 (80° C.) | 0.61 | 25.7 |
| A10 | 267 (80° C.) | 0.67 | 24.8 |
| D1 | 271 (80° C.) | 16.2 | 21.1 |
| D2 | 177 (80° C.) | 14.5 | 11.2 |
| D3 | 182 (60° C.) | 15.3 | 15.5 |
| D4 | 230 (55° C.) | 15.7 | 14.3 |
| D5 | 232 (80° C.) | 15.5 | 8.7 |
| D6 | 225 (80° C.) | 14.9 | 10.7 |

As can be seen from the results of FIG. 3-5, the gelatinized fluid used to form the $CO_2$-sensitive fracturing and displacement fluid of the present invention has a higher steady-state shear viscosity and the viscosity is independent of shear rate at low shear rates, and the characteristics of Newtonian fluid are exhibited, and obvious shear thinning occurs at high shear rate, indicating the formation of wormlike micelles within the gelatinized fluid of the present invention. As shown in FIG. 6, the viscoelasticity of the gelatinized fluid used to form the $CO_2$-sensitive fracturing and displacement fluid of the invention conforms to the Maxwell's law, which indicates that a wormlike micelle is formed in the gelatinized fluid system used to form the $CO_2$-sensitive fracturing and displacement fluid of the present invention, with good viscoelastic properties. It can be seen from the results of Table 1 and FIG. 7-9 that the viscosity of the $CO_2$-sensitive fracturing and displacement fluid of the present invention which is sheared at 170 s$^{-1}$ and at a medium temperature for 2 h is still greater than 20 mPa·s, and the temperature and pressure resistance is good. It can be seen from the results of Table 1 and FIG. 11 that the falling ball in the $CO_2$-sensitive fracturing and displacement fluid of the present invention has a small settling velocity and a strong sand-carrying capacity. It can be seen from the results of Table 1 and FIG. 13-17 that the $CO_2$-sensitive fracturing and displacement fluid of the present invention has a high core imbibition recovery rate and exhibits better imbibition and oil discharge ability when used in a medium temperature reservoir, which is much higher than the imbibition and oil discharge ability without adding the $CO_2$-sensitive fracturing and displacement fluid, which can significantly improve the recovery ratio of tight oil.

The preferred Examples of the present invention have been described in detail above, but the present invention is not limited thereto. Within the scope of the technical idea of the present invention, various simple variations can be made to the technical solutions of the present invention, including various technical features combined in any other suitable manner, and these simple variations and combinations should also be regarded as the disclosure of the present invention, and fall within the scope of protection of the present invention.

What is claimed is:

1. A $CO_2$-sensitive fracturing and displacement fluid, comprising
    a surfactant,
    an auxiliary agent,
    water, and
    $CO_2$,
    wherein $CO_2$ is in a liquid and/or supercritical state, and
    wherein the content of the surfactant is 1-15 wt %, the content of the auxiliary agent is 0.1-10 wt %, and the content of the $CO_2$ in a liquid and/or the supercritical state is 10-70 wt % with respect to the total weight of the $CO_2$-sensitive fracturing and displacement fluid,
    wherein the surfactant and the auxiliary agent are jointly selected from the group consisting of
        (i) wherein the surfactant is a nonionic surfactant, and the auxiliary agent is selected from the group consisting of an anionic cosurfactant, a $CO_2$ emulsifier, and combination thereof;
        (ii) wherein the surfactant is an anionic surfactant, and the auxiliary agent is selected from the group consisting of a nonionic cosurfactant, a $CO_2$ emulsifier and combination thereof; and
        (iii) wherein the surfactant is a zwitterionic surfactant, the auxiliary agent is selected from the group consisting of a mixture of a nonionic cosurfactant and an anionic cosurfactant, a $CO_2$ emulsifier and combination thereof, wherein the weight ratio of the nonionic cosurfactant to the anionic cosurfactant in the mixture is between from 1:4 to 1:0.25
        wherein the zwitterionic surfactant comprises fatty amide propyl hydroxy sulfobetaine,
        wherein the nonionic cosurfactant comprises N,N,N',N'-tetramethyl-1,3-propanediamine,
        wherein the anionic cosurfactant comprises soluble p-toluenesulfonate, and
        wherein the $CO_2$ emulsifier comprises sodium bis (2-ethylhexyl) sulfosuccinate.

2. The $CO_2$-sensitive fracturing and displacement fluid of claim 1, wherein the nonionic surfactant is selected from the group consisting of an amide surfactant, an amidine surfactant, a guanidine surfactant and combination thereof;
the anionic surfactant is selected from the group consisting of carboxylate containing an aliphatic hydrocarbon chain, carboxylate containing fatty alcohol polyoxyethylene ether, sulfate containing an aliphatic hydrocarbon chain, sulfate containing fatty alcohol polyoxyethylene ether, sulfonate containing an aliphatic hydrocarbon chain, sulfonate containing fatty alcohol polyoxyethylene ether and combination thereof;
the zwitterionic surfactant further comprises sulfobetaine, carboxybetaine and combination thereof;
the anionic cosurfactant further comprises soluble salicylate, soluble dodecyl sulfate, soluble dodecyl sulfonate, soluble dodecyl benzene sulfonate, soluble maleate, soluble benzoate, soluble terephthalate and combination thereof;
the nonionic cosurfactant further comprises organic amines having a structure of a formula (I),

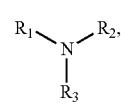

Formula (I)

wherein $R_1$ is a $C_1$-$C_4$ linear or branched alkyl group optionally substituted with an amino group, a $C_1$-$C_4$ linear or branched alkyl group optionally substituted with a hydroxy group, a phenyl group optionally substituted with an amino group, and a $C_2$-$C_3$ linear or branched alkyl group optionally substituted with a dimethylamino group; and
$R_2$ and $R_3$ are each independently selected from a hydrogen atom, a $C_1$-$C_3$ linear or branched alkyl group optionally substituted with an amino group, and a $C_1$-$C_3$ linear or branched alkyl group optionally substituted with a hydroxy group; and
the $CO_2$ emulsifier further comprises octyl phenyl polyoxyethylene ether, a fluorocarbon surfactant and combination thereof.

3. The $CO_2$-sensitive fracturing and displacement fluid of claim 1, comprising a nonionic surfactant, an anionic cosurfactant, water and $CO_2$, and, optionally, a $CO_2$ emulsifier,
    wherein the content of the nonionic surfactant is 1-15 wt %, the content of the anionic cosurfactant is 0.1-10 wt %, the content of $CO_2$ is 10-70 wt %, and the content of the optional $CO_2$ emulsifier is 0-10 wt %, with respect to the total weight of the $CO_2$-sensitive fracturing and displacement fluid, and
    wherein the nonionic surfactant is selected from the group consisting of palmitic amide propyl dimethylamine, stearic amide propyl dimethylamine, oleamide propyl dimethylamine, erucoylamidopropyl dimethylamine, behenamide propyl dimethylamine, N'-dodecyl-N,N-dimethylacetamidine, N'-hexadecyl-N,N-dimethylacetamidine, N'-octadecyl-N,N-dimethylacetamidine, N,N'-didodecylethylamidine, dodecyltetramethylguanidine, hexadecyltetramethylguanidine, octadecyltetramethylguanidine and combination thereof;
    wherein the anionic cosurfactant further comprises soluble salicylate, soluble dodecyl sulfate, soluble dodecyl sulfonate, soluble dodecyl benzene sulfonate, soluble maleate, soluble benzoate, soluble terephthalate and combination thereof;

$CO_2$ is in a liquid and/or supercritical state, and wherein the $CO_2$ emulsifier further comprises octylphenyl polyoxyethylene ether, a fluorocarbon surfactant and combination thereof.

4. The $CO_2$-sensitive fracturing and displacement fluid of claim 1, comprising an anionic surfactant, a nonionic cosurfactant, water and $CO_2$, and, optionally a $CO_2$ emulsifier, wherein the content of the anionic surfactant is 1-15 wt %, the content of the nonionic cosurfactant is 0.1-10 wt %, the content of $CO_2$ is 10-70 wt %, and the content of the optional $CO_2$ emulsifier is 0-10 wt %, with respect to the total weight of the $CO_2$-sensitive fracturing and displacement fluid, and wherein wherein the anionic surfactant is selected from the group consisting of saturated or unsaturated aliphatic hydrocarbyl carboxylate having 12 to 22 carbon atoms, linear alkyl alcohol ether carboxylate having 12 to 22 carbon atoms, saturated or unsaturated aliphatic hydrocarbyl sulfate having 12 to 22 carbon atoms, linear alkyl alcohol ether sulfate having 12 to 22 carbon atoms, saturated or unsaturated aliphatic hydrocarbyl sulfonate having 12 to 22 carbon atoms, and linear alkyl alcohol ether sulfonate having 12 to 22 carbon atoms, and combination thereof;

wherein the nonionic cosurfactant further comprising 3 diethylaminopropylamine, N,N-dimethyl-p-phenylenediamine, p-phenylenediamine, tetramethyl-ethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof;

$CO_2$ is in a liquid and/or supercritical state, and wherein the $CO_2$ emulsifier further comprising octylphenyl polyoxyethylene ether, a fluorocarbon surfactant and combination thereof.

5. The $CO_2$-sensitive fracturing and displacement fluid of claim 1, comprising a zwitterionic surfactant, a nonionic cosurfactant, an anionic cosurfactant, water and $CO_2$, and, optionally, a $CO_2$ emulsifier, wherein the content of the zwitterionic surfactant is 1-15 wt %, the sum content of the mixture of the nonionic cosurfactant and the anionic cosurfactant is 0.1-10 wt %, the content of $CO_2$ is 10-70 wt %, wherein the weight ratio of the nonionic cosurfactant to the anionic cosurfactant in the mixture is between from 1:4 to 1:0.25, and the content of $CO_2$ emulsifier is 0-10 wt %, with respect to the total weight of the $CO_2$-sensitive fracturing and displacement fluid, and wherein the zwitterionic surfactant further comprises fatty amide propyl sulfobetaine, linear alkyl sulfobetaine having 12 to 22 carbon atoms, linear alkyl carboxybetaine having 12 to 22 carbon atoms, fatty amide carboxybetaine and combination thereof;

wherein the nonionic cosurfactant further comprises 3 diethylaminopropylamine, N,N-dimethyl-p-phenylenediamine, p-phenylenediamine, tetramethyl-ethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof;

wherein the anionic cosurfactant further comprises soluble salicylate, soluble dodecyl sulfate, soluble dodecyl sulfonate, soluble dodecyl benzene sulfonate, soluble maleate, soluble benzoate, soluble terephthalate and combination thereof;

$CO_2$ is in a liquid and/or supercritical state, and wherein the $CO_2$ emulsifier further comprises octylphenyl polyoxyethylene ether, a fluorocarbon surfactant and combination thereof.

6. A method for preparing the $CO_2$-sensitive fracturing and displacement fluid of claim 1, wherein the method comprises the steps:

(1) mixing a surfactant, an auxiliary agent and water to form a base fluid, wherein the mixing process is carried out under stirring at a temperature of 20-50° C. for 5-20 min;

(2) introducing $CO_2$ into the base fluid for gelatinizing to form a gelatinized mixture, wherein the amount of $CO_2$ introduced clarifies the system;

(3) allowing the gelatinized mixture to stand until bubbles in the gelatinized mixture disappear, so that gelatinized fluid is obtained; and (4) re-introducing $CO_2$ into the gelatinized fluid until no more foam is generalized in the system to form the $CO_2$-sensitive fracturing and displacement fluid, wherein the $CO_2$ re-introducing condition makes $CO_2$ in the formed $CO_2$-sensitive fracturing and displacement fluid in a liquid or supercritical state, and the formed $CO_2$-sensitive fracturing and displacement fluid is a viscoelastic emulsion, wherein the dosage of the surfactant is 1-15 wt %, the dosage of the auxiliary agent is 0.1-10 wt %, and the dosage of $CO_2$ is 10-70 wt %, with respect to the total weight of the $CO_2$-sensitive fracturing and displacement fluid.

7. The method of claim 6, wherein the surfactant and the auxiliary agent are jointly selected from the group consisting of (i) wherein the surfactant is a nonionic surfactant, and the auxiliary agent is selected from the group consisting of an anionic cosurfactant, a $CO_2$ emulsifier and combination thereof;

(ii) wherein the surfactant is an anionic surfactant, and the auxiliary agent is selected from the group consisting of a nonionic cosurfactant, a $CO_2$ emulsifier and combination thereof; and (iii) wherein the surfactant is a zwitterionic surfactant, the auxiliary agent is selected from the group consisting of a mixture of a nonionic cosurfactant and an anionic cosurfactant, a $CO_2$ emulsifier and combination thereof, wherein the weight ratio of the nonionic cosurfactant to the anionic cosurfactant in the mixture is between from 1:4 to 1:0.25.

8. The method of claim 6, wherein the nonionic surfactant is selected from the group consisting of an amide surfactant, an amidine surfactant, a guanidine surfactant and combination thereof;

the anionic surfactant is selected from the group consisting of carboxylic acid salt containing an aliphatic hydrocarbon chain, carboxylic acid salt containing fatty alcohol polyoxyethylene ether, sulfate containing an aliphatic hydrocarbon chain, sulfate containing fatty alcohol polyoxyethylene ether, sulfonate containing an aliphatic hydrocarbon chain, sulfonate containing fatty alcohol polyoxyethylene ether and combination thereof;

the zwitterionic surfactant is selected from the group consisting of sulfobetaine, carboxybetaine and combination thereof;

the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof;

the nonionic cosurfactant is selected from organic amine having a structure of a formula (I),

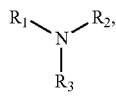

Formula (I)

wherein $R_1$ is a $C_1$-$C_4$ linear or branched alkyl group optionally substituted with an amino group, a $C_1$-$C_4$ linear or branched alkyl group optionally substituted with a hydroxy group, a phenyl group optionally substituted with an amino group, and a $C_2$-$C_3$ linear or branched alkyl group optionally substituted with a dimethylamino group;

$R_2$ and $R_3$ are each independently selected from a hydrogen atom, a $C_1$-$C_3$ linear or branched alkyl group optionally substituted with an amino group, and a $C_1$-$C_3$ linear or branched alkyl group optionally substituted with a hydroxy group; and the $CO_2$ emulsifier is selected from the group consisting of sodium bis(2-ethylhexyl)sulfosuccinate, octyl phenyl polyoxyethylene ether, a fluorocarbon surfactant and combination thereof.

9. The method of claim 6, wherein the surfactant is a nonionic surfactant, the auxiliary agent is an anionic cosurfactant and optionally a $CO_2$ emulsifier, wherein the dosage of the nonionic surfactant is 1-15 wt %, the dosage of the anionic cosurfactant is 0.1-10 wt %, the dosage of the optional $CO_2$ emulsifier is 0-10 wt % and the dosage of $CO_2$ is 10-70 wt %, with respect to the total weight of the $CO_2$-sensitive fracturing and displacement fluid; wherein the nonionic surfactant is selected from the group consisting of palmitic amide propyl dimethylamine, stearic amide propyl dimethylamine, oleamide propyl dimethylamine, erucoylamidopropyl dimethylamine, behenamide propyl dimethylamine, N'-dodecyl-N,N-dimethylacetamidine, N'-hexadecyl-N,N-dimethylacetamidine, N'-octadecyl-N,N-dimethylacetamidine, N,N'-didodecylethylamidine, dodecyltetramethylguanidine, hexadecyltetramethylguanidine, octadecyltetramethylguanidine and combination thereof;

the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof; and the $CO_2$ emulsifier is selected from the group consisting of sodium bis(2-ethylhexyl)sulfosuccinate, octylphenyl polyoxyethylene ether, a fluorocarbon surfactant and combination thereof.

10. The method of claim 6, wherein the surfactant is an anionic surfactant, and the auxiliary agent is a nonionic cosurfactant and optionally a $CO_2$ emulsifier, wherein the dosage of the anionic surfactant is 1-15 wt %, the dosage of the nonionic cosurfactant is 0.1-10 wt %, the dosage of the optional $CO_2$ emulsifier is 0-10 wt % and the dosage of $CO_2$ is 10-70 wt %, with respect to the total weight of the $CO_2$-sensitive fracturing and displacement fluid; wherein the anionic surfactant is selected from the group consisting of saturated or unsaturated aliphatic hydrocarbyl carboxylate having 12 to 22 carbon atoms, linear alkyl alcohol ether carboxylate having 12 to 22 carbon atoms, saturated or unsaturated aliphatic hydrocarbyl sulfate having 12 to 22 carbon atoms, linear alkyl alcohol ether sulfate having 12 to 22 carbon atoms, saturated or unsaturated aliphatic hydrocarbyl sulfonate having 12 to 22 carbon atoms, and linear alkyl alcohol ether sulfonate having 12 to 22 carbon atoms, and combination thereof;

the nonionic cosurfactant is selected from the group consisting of N,N,N',N'-tetramethyl-1,3-propanediamine, 3-diethylaminopropylamine, N,N-dimethyl-p-phenylenediamine, p-phenylenediamine, tetramethylethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof; and the $CO_2$ emulsifier is selected from the group consisting of sodium bis(2-ethylhexyl)sulfosuccinate, octylphenyl polyoxyethylene ether, a fluorocarbon surfactant and combination thereof.

11. The method of claim 6, wherein the surfactant is a zwitterionic surfactant, the auxiliary agent is a mixture of a nonionic cosurfactant and an anionic cosurfactant, and optionally a $CO_2$ emulsifier, wherein the dosage of the zwitterionic surfactant is 1-15 wt %, the sum content of the mixture of the nonionic cosurfactant and the anionic cosurfactant is 0.1-10 wt %, the dosage of the optional $CO_2$ emulsifier is 0-10 wt % and the dosage of $CO_2$ is 10-70 wt %, with respect to the total weight of the $CO_2$-sensitive fracturing and displacement fluid, wherein the weight ratio of the nonionic cosurfactant to the anionic cosurfactant in the mixture is between from 1:4 to 1:0.25; wherein the zwitterionic surfactant is selected from the group consisting of fatty amide propyl hydroxy sulfobetaine, fatty amide propyl sulfobetaine, linear alkyl sulfobetaine having 12 to 22 carbon atoms, linear alkyl carboxybetaine having 12 to 22 carbon atoms, fatty amide carboxybetaine and combination thereof;

the nonionic cosurfactant is selected from the group consisting of N,N,N',N'-tetramethyl-1,3-propanediamine, 3-diethylaminopropylamine, N,N-dimethyl-p-phenylenediamine, p-phenylenediamine, tetramethylethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof;

the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof; and the $CO_2$ emulsifier is selected from the group consisting of sodium bis(2-ethylhexyl)sulfosuccinate, octylphenyl polyoxyethylene ether, a fluorocarbon surfactant and combination thereof.

12. A method for fracturing and displacement of a tight oil reservoir, comprising:
injecting the $CO_2$-sensitive fracturing and displacement fluid of claim 2 and an encapsulated gel breaker into a reservoir,
after completion of a fracturing, allowing the gel breaker to flow out of capsules to break the gel,
maintaining the gel breaker outside of the capsules for 5-15 days after the gel is broken, and
allowing the gel breaker fluid to flow back,
wherein the dosage of the encapsulated gel breaker is 4-15 wt %, with respect to the total weight of the $CO_2$-sensitive fracturing and displacement fluid.

13. The method for fracturing and displacement of claim 12, wherein the capsule core of the encapsulated gel breaker is the gel breaker, the capsule shell of the encapsulated gel breaker is a polymer film, and the content of the capsule core is 70-80% by weight and the content of the capsule shell is 20-30% by weight, with respect to the total weight of the encapsulated gel breaker.

14. The method for fracturing and displacement of claim 12, wherein the nonionic surfactant is selected from the group consisting of an amide surfactant, an amidine surfactant, a guanidine surfactant and combination thereof;
the anionic surfactant is selected from the group consisting of carboxylic acid salt containing an aliphatic hydrocarbon chain, carboxylic acid salt containing fatty alcohol polyoxyethylene ether, sulfate containing an aliphatic hydrocarbon chain, sulfate containing fatty alcohol polyoxyethylene ether, sulfonate containing an aliphatic hydrocarbon chain, sulfonate containing fatty alcohol polyoxyethylene ether and combination thereof;
the zwitterionic surfactant is selected from the group consisting of sulfobetaine, carboxybetaine and combination thereof;
the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof;
the nonionic cosurfactant is selected from organic amine having a structure of a formula (I),

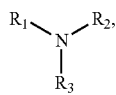

Formula (I)

wherein $R_1$ is a $C_1$-$C_4$ linear or branched alkyl group optionally substituted with an amino group, a $C_1$-$C_4$ linear or branched alkyl group optionally substituted with a hydroxy group, a phenyl group optionally substituted with an amino group, and a $C_2$-$C_3$ linear or branched alkyl group optionally substituted with a dimethylamino group;
$R_2$ and $R_3$ are each independently selected from a hydrogen atom, a $C_1$-$C_3$ linear or branched alkyl group optionally substituted with an amino group, and a $C_1$-$C_3$ linear or branched alkyl group optionally substituted with a hydroxy group; and
the $CO_2$ emulsifier is selected from the group consisting of sodium bis(2-ethylhexyl)sulfosuccinate, octyl phenyl polyoxyethylene ether, a fluorocarbon surfactant and combination thereof.

15. The method for fracturing and displacement of claim 12, wherein the $CO_2$-sensitive fracturing and displacement fluid comprises a nonionic surfactant, an anionic cosurfactant, water and $CO_2$, and optionally a $CO_2$ emulsifier,
wherein the content of the nonionic surfactant is 1-15 wt %, the content of the anionic cosurfactant is 0.1-10 wt %, the content of $CO_2$ is 10-70 wt %, and the content of the optional $CO_2$ emulsifier is 0-10 wt %, with respect to the total weight of the $CO_2$-sensitive fracturing and displacement fluid, and wherein
the nonionic surfactant is selected from the group consisting of palmitic amide propyl dimethylamine, stearic amide propyl dimethylamine, oleamide propyl dimethylamine, erucoylamidopropyl dimethylamine, behenamide propyl dimethylamine, N'-dodecyl-N,N-dimethylacetamidine, N'-hexadecyl-N,N-dimethylacetamidine, N'-octadecyl-N,N-dimethylacetamidine, N,N'-didodecylethylamidine, dodecyltetramethylguanidine, hexadecyltetramethylguanidine, octadecyltetramethylguanidine and combination thereof;
the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof;
the $CO_2$ is in a liquid and/or supercritical state, and
the $CO_2$ emulsifier is selected from the group consisting of sodium bis(2-ethylhexyl)sulfosuccinate, octylphenyl polyoxyethylene ether, a fluorocarbon surfactant and combination thereof.

16. The method for fracturing and displacement of claim 12, wherein the $CO_2$-sensitive fracturing and displacement fluid comprises an anionic surfactant, a nonionic cosurfactant, water and $CO_2$, as well as a $CO_2$ emulsifier which is optionally added, the content of the anionic surfactant is 1-15 wt %, the content of the nonionic cosurfactant is 0.1-10 wt %, the content of $CO_2$ is 10-70 wt %, and the content of the optional $CO_2$ emulsifier is 0-10 wt %, with respect to the total weight of the $CO_2$-sensitive fracturing and displacement fluid, and wherein
the anionic surfactant is selected from the group consisting of saturated or unsaturated aliphatic hydrocarbyl carboxylate having 12 to 22 carbon atoms, linear alkyl alcohol ether carboxylate having 12 to 22 carbon atoms, saturated or unsaturated aliphatic hydrocarbyl sulfate having 12 to 22 carbon atoms, linear alkyl alcohol ether sulfate having 12 to 22 carbon atoms, saturated or unsaturated aliphatic hydrocarbyl sulfonate having 12 to 22 carbon atoms, and linear alkyl alcohol ether sulfonate having 12 to 22 carbon atoms, and combination thereof;
the nonionic cosurfactant is selected from the group consisting of N,N,N',N'-tetramethyl-1,3-propanediamine, 3-diethylaminopropylamine, N,N-dimethyl-p-phenylenediamine, p-phenylenediamine, tetramethylethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof;
the $CO_2$ is in a liquid and/or supercritical state, and
the $CO_2$ emulsifier is selected from the group consisting of sodium bis(2-ethylhexyl)sulfosuccinate, octylphenyl polyoxyethylene ether, a fluorocarbon surfactant and combination thereof.

17. The method for fracturing and displacement of claim 12, wherein the $CO_2$-sensitive fracturing and displacement fluid comprises a zwitterionic surfactant, a nonionic cosurfactant, an anionic cosurfactant, water and $CO_2$, as well as a $CO_2$ emulsifier which is optionally added, the content of the zwitterionic surfactant is 1-15 wt %, the sum content of the mixture of the nonionic cosurfactant and the anionic cosurfactant is 0.1-10 wt %, the content of $CO_2$ is 10-70 wt %, wherein the weight ratio of the nonionic cosurfactant to the anionic cosurfactant in the mixture is between from 1:4 to 1:0.25, and the content of $CO_2$ emulsifier is 0-10 wt %, with respect to the total weight of the $CO_2$-sensitive fracturing and displacement fluid, and the zwitterionic surfactant is selected from the group consisting of fatty amide propyl hydroxy sulfobetaine, fatty amide propyl sulfobetaine, linear alkyl sulfobetaine having 12 to 22 carbon atoms, linear alkyl carboxybetaine having 12 to 22 carbon atoms, fatty amide carboxybetaine and combination thereof;

the nonionic cosurfactant is selected from the group consisting of N,N,N',N'-tetramethyl-1,3-propanediamine, 3-diethylaminopropylamine, N,N-dimethyl-p-phenylenediamine, p-phenylenediamine, tetramethylethylenediamine, bis(2-hydroxypropyl)amine, N-(2-hydroxyethyl)ethylenediamine, triethanolamine, diisopropanolamine, 1,4-butadiamine, isopropanolamine, di-n-propylamine, diethanolamine, N,N-dimethylethanolamine, N,N-dimethylpropanolamine, N-methyldiethanolamine and combination thereof;

the anionic cosurfactant is selected from the group consisting of soluble salicylate, soluble p-toluenesulfonate, soluble dodecyl sulfate, soluble dodecyl sulfonate, soluble dodecyl benzene sulfonate, soluble maleate, soluble benzoate, soluble terephthalate and combination thereof;

the $CO_2$ is in a liquid and/or supercritical state, and the $CO_2$ emulsifier is selected from the group consisting of sodium bis(2-ethylhexyl)sulfosuccinate, octylphenyl polyoxyethylene ether, a fluorocarbon surfactant and combination thereof.

* * * * *